(12) United States Patent
Stefani et al.

(10) Patent No.: US 8,800,965 B2
(45) Date of Patent: Aug. 12, 2014

(54) BUTTERFLY VALVE WITH A RIGID SEAL

(75) Inventors: Yves Stefani, Vanves (FR); Roland Lucotte, Hurigny (FR)

(73) Assignees: Saint-Gobain Performance Plastics Corporation, Aurora, OH (US); Saint-Gobain Performance Plastics France, Chamy (FR)

( * ) Notice: Subject to any disclaimer, the term of this patent is extended or adjusted under 35 U.S.C. 154(b) by 869 days.

(21) Appl. No.: 12/262,088

(22) Filed: Oct. 30, 2008

(65) Prior Publication Data

US 2009/0184476 A1 Jul. 23, 2009

Related U.S. Application Data

(60) Provisional application No. 60/983,999, filed on Oct. 31, 2007.

(30) Foreign Application Priority Data

Oct. 31, 2007 (FR) ...................................... 07 07659

(51) Int. Cl.
*F16K 1/226* (2006.01)

(52) U.S. Cl.
USPC .......................................... 251/305; 251/362

(58) Field of Classification Search
USPC .................................. 251/305–308, 359–365
See application file for complete search history.

(56) References Cited

U.S. PATENT DOCUMENTS

| | | | |
|---|---|---|---|
| 1,542,940 A | 6/1925 | Hughes | |
| 2,146,218 A | 12/1935 | Kimmich et al. | |
| 2,070,291 A | 2/1937 | McHugh | |
| 2,757,966 A | 8/1956 | Samiran | |
| 3,047,937 A | 8/1962 | De Vecchi | |
| 3,144,040 A * | 8/1964 | White | 137/315.23 |
| 3,197,174 A * | 7/1965 | Killian | 251/307 |
| 3,241,806 A | 3/1966 | Snell | |
| 3,253,841 A | 5/1966 | Ahmad | |
| 3,329,398 A | 7/1967 | Goldsmith | |
| 3,393,697 A * | 7/1968 | Fawkes | 137/315.23 |

(Continued)

FOREIGN PATENT DOCUMENTS

| | | |
|---|---|---|
| CN | 2118886 U | 10/1992 |
| CN | 2315365 Y | 4/1999 |

(Continued)

OTHER PUBLICATIONS

Technical Search Results, 74 pgs.

(Continued)

*Primary Examiner* — John Bastianelli

(74) *Attorney, Agent, or Firm* — Abel Law Group, LLP; Chi Suk Kim

(57) ABSTRACT

A valve is disclosed and can include a valve body having a central bore for passage of fluid there through and a longitudinal axis. The valve can also include a seal installed within the valve body along the central bore. The seal can include a first seal member having an annular ring portion and a hub portion extending from the annular ring portion. The seal can also include a second seal member including an annular ring configured to engage a distal end of the hub portion and create a sealing engagement between the hub portion and the annular ring when a compressive force is applied to the first and the second seal members.

19 Claims, 33 Drawing Sheets

(56) References Cited

U.S. PATENT DOCUMENTS

| | | | |
|---|---|---|---|
| 3,539,148 A | 11/1970 | Boos, Jr. | |
| 3,583,670 A * | 6/1971 | Manske | 251/307 |
| 3,612,483 A | 10/1971 | Pool | |
| 3,656,769 A | 4/1972 | Jelinek et al. | |
| 3,666,233 A | 5/1972 | Scaramucci | |
| 3,666,236 A | 5/1972 | Gachot | |
| 3,702,199 A | 11/1972 | Brooks | |
| 3,744,753 A * | 7/1973 | Clow et al. | 251/307 |
| 3,774,880 A | 11/1973 | Crookham et al. | |
| 3,790,130 A | 2/1974 | Getty | |
| 3,799,501 A | 3/1974 | Hartman | |
| 3,902,697 A | 9/1975 | Robinson | |
| 3,945,390 A | 3/1976 | Huber | |
| 3,958,314 A | 5/1976 | Kurkjian, Jr. | |
| 3,967,812 A | 7/1976 | Newell et al. | |
| 3,977,708 A | 8/1976 | Jopp | |
| 4,006,883 A * | 2/1977 | Hilsheimer | 251/307 |
| 4,055,323 A | 10/1977 | Gachot | |
| 4,108,479 A | 8/1978 | Straub | |
| 4,162,782 A | 7/1979 | Wilkins | |
| 4,216,980 A | 8/1980 | Shreve | |
| 4,227,675 A | 10/1980 | Sutter et al. | |
| 4,259,980 A | 4/1981 | Muller | |
| 4,266,752 A | 5/1981 | Johnson | |
| 4,266,753 A * | 5/1981 | Okada | 251/305 |
| 4,266,754 A | 5/1981 | Ninomiya et al. | |
| 4,306,706 A | 12/1981 | Olansen et al. | |
| 4,325,414 A | 4/1982 | Schaefer | |
| 4,336,958 A | 6/1982 | Goetzinger | |
| 4,348,006 A | 9/1982 | Schmitt et al. | |
| 4,358,086 A | 11/1982 | Hiltebrand | |
| 4,398,695 A | 8/1983 | Torche | |
| RE31,417 E | 10/1983 | Huber | |
| 4,411,407 A | 10/1983 | Ninomiya et al. | |
| 4,457,490 A | 7/1984 | Scobie | |
| 4,462,568 A | 7/1984 | Taylor et al. | |
| 4,465,260 A | 8/1984 | Conley et al. | |
| 4,531,710 A * | 7/1985 | Tort | 251/167 |
| 4,575,046 A * | 3/1986 | Krause et al. | 251/316 |
| 4,634,097 A * | 1/1987 | Hubertson | 251/173 |
| 4,674,528 A | 6/1987 | Nishio et al. | |
| 4,676,481 A | 6/1987 | Hayes | |
| 4,699,177 A | 10/1987 | Thomas | |
| 4,699,357 A | 10/1987 | Sisk | |
| 4,702,498 A | 10/1987 | Mueller et al. | |
| 4,740,347 A | 4/1988 | Sloan et al. | |
| 4,759,530 A | 7/1988 | Iff | |
| 4,763,877 A * | 8/1988 | Kennedy | 251/362 |
| 4,773,306 A | 9/1988 | Dirkin | |
| 4,784,411 A | 11/1988 | Tueckmantel | |
| 4,796,857 A | 1/1989 | Hayes et al. | |
| 4,813,650 A * | 3/1989 | Dingler | 251/360 |
| 4,822,001 A | 4/1989 | Sisk | |
| 4,848,802 A | 7/1989 | Wolf et al. | |
| 5,058,931 A | 10/1991 | Bowsher | |
| 5,118,078 A | 6/1992 | Younker | |
| 5,152,501 A | 10/1992 | Raymond, Jr. | |
| 5,160,118 A | 11/1992 | Stary | |
| 5,180,193 A | 1/1993 | Rung et al. | |
| 5,199,153 A | 4/1993 | Schulte-Ladbeck | |
| 5,224,738 A | 7/1993 | Taga | |
| 5,295,659 A | 3/1994 | Steele | |
| 5,297,773 A | 3/1994 | Collins | |
| 5,388,807 A | 2/1995 | Habicht | |
| 5,437,482 A | 8/1995 | Curtis | |
| 5,470,111 A | 11/1995 | Nelson et al. | |
| 5,478,047 A | 12/1995 | Best et al. | |
| 5,489,631 A | 2/1996 | Dubois | |
| 5,511,797 A | 4/1996 | Nikirk et al. | |
| 5,532,299 A | 7/1996 | Dubois | |
| 5,549,276 A | 8/1996 | Pittman et al. | |
| 5,553,830 A | 9/1996 | Stary | |
| 5,573,282 A | 11/1996 | Egner et al. | |
| 5,577,742 A | 11/1996 | Nicholson et al. | |
| 5,645,301 A | 7/1997 | Kingsford et al. | |
| 5,649,567 A | 7/1997 | Butler et al. | |
| 5,685,520 A | 11/1997 | Velan | |
| 5,738,336 A | 4/1998 | McKnight et al. | |
| 5,876,070 A | 3/1999 | McNealy et al. | |
| 5,979,872 A | 11/1999 | Stearns et al. | |
| 5,996,636 A | 12/1999 | Fukano et al. | |
| 5,997,049 A | 12/1999 | Kingsford et al. | |
| 6,029,949 A | 2/2000 | Brown et al. | |
| 6,183,021 B1 | 2/2001 | Walsh et al. | |
| 6,186,476 B1 | 2/2001 | Goldsweer et al. | |
| 6,189,860 B1 | 2/2001 | Sato et al. | |
| 6,312,024 B1 | 11/2001 | Dutilleul et al. | |
| 6,409,222 B1 | 6/2002 | Donoho et al. | |
| 6,412,832 B1 | 7/2002 | Donoho et al. | |
| 6,523,863 B2 | 2/2003 | Ishiwata | |
| 6,607,179 B2 | 8/2003 | Moretti et al. | |
| 6,642,451 B1 | 11/2003 | Gretz | |
| 6,692,036 B2 | 2/2004 | Nguyen et al. | |
| 6,726,177 B2 * | 4/2004 | Wang | 251/306 |
| 6,832,762 B2 | 12/2004 | Jost | |
| 6,966,537 B2 | 11/2005 | Sundararajan | |
| 6,976,712 B2 | 12/2005 | Lukach, Jr. | |
| 7,036,204 B2 | 5/2006 | Fischer et al. | |
| 7,059,585 B2 | 6/2006 | Dalluge et al. | |
| 7,107,662 B1 | 9/2006 | Levario | |
| 8,104,796 B2 | 1/2012 | Stefani et al. | |
| 2001/0032956 A1 | 10/2001 | Khokhar | |
| 2001/0052700 A1 | 12/2001 | Starita | |
| 2002/0070544 A1 | 6/2002 | Kingsford et al. | |
| 2002/0079693 A1 | 6/2002 | Spiering et al. | |
| 2002/0130290 A1 | 9/2002 | Oberbeck | |
| 2002/0163193 A1 | 11/2002 | Abuellel | |
| 2003/0015681 A1 | 1/2003 | Chatufale | |
| 2003/0062500 A1 | 4/2003 | Eggleston et al. | |
| 2003/0075876 A1 | 4/2003 | Gonsior | |
| 2004/0080160 A1 | 4/2004 | Rief | |
| 2005/0073145 A1 | 4/2005 | Boudry et al. | |
| 2005/0151107 A1 | 7/2005 | Shu | |
| 2005/0212284 A1 | 9/2005 | Dole | |
| 2005/0242317 A1 | 11/2005 | Malki et al. | |
| 2005/0247349 A1 | 11/2005 | Barrows et al. | |
| 2006/0038155 A1 | 2/2006 | Lam | |
| 2007/0007768 A1 | 1/2007 | Ho | |
| 2007/0074759 A1 | 4/2007 | McClung, Jr. | |
| 2009/0127851 A1 | 5/2009 | Stefani et al. | |
| 2010/0308248 A1 | 12/2010 | Stefani et al. | |

FOREIGN PATENT DOCUMENTS

| | | |
|---|---|---|
| CN | 2343429 Y | 10/1999 |
| CN | 2428639 Y | 5/2001 |
| CN | 2436729 Y | 6/2001 |
| CN | 1611818 A | 5/2005 |
| CN | 2748739 Y | 12/2005 |
| CN | 2881275 Y | 3/2007 |
| DE | 20 30 263 A1 | 12/1971 |
| DE | 3607736 A1 | 9/1987 |
| DE | 3623310 C2 | 1/1988 |
| DE | 4417669 A1 | 11/1995 |
| DE | 196 37 083 A1 | 3/1998 |
| DE | 19727236 A1 | 1/1999 |
| DE | 202005002511 U1 | 6/2005 |
| EP | 0037533 B1 | 10/1981 |
| EP | 0498315 A3 | 10/1992 |
| EP | 0591687 A1 | 4/1994 |
| EP | 0757766 B1 | 2/1997 |
| EP | 0784770 B1 | 7/1997 |
| EP | 0808433 B1 | 11/1997 |
| EP | 0859177 A1 | 8/1998 |
| EP | 0905428 B1 | 3/1999 |
| EP | 0992720 A1 | 4/2000 |
| EP | 774090 B1 | 3/2002 |
| EP | 1239199 A1 | 9/2002 |
| EP | 1507107 A1 | 2/2005 |
| EP | 1 593 887 A | 11/2005 |
| FR | 1 272 997 A | 10/1961 |
| FR | 2259299 | 8/1975 |
| FR | 2 651 851 A | 3/1991 |
| FR | 2866094 A1 | 8/2005 |

(56) References Cited

FOREIGN PATENT DOCUMENTS

| | | |
|---|---|---|
| GB | 1 180 047 A | 2/1970 |
| GB | 2192255 A | 1/1988 |
| GB | 2213894 A | 8/1989 |
| GB | 2303901 A | 3/1997 |
| JP | 58-057566 A | 4/1983 |
| JP | 62-110094 | 5/1987 |
| JP | 1-238794 | 9/1989 |
| JP | 6-42682 | 2/1994 |
| JP | 08145196 A | 6/1996 |
| JP | 09-119529 A | 5/1997 |
| JP | 2000-227164 A | 8/2000 |
| JP | 2002-005311 A | 1/2002 |
| JP | 22323147 A2 | 11/2002 |
| JP | 23166654 A2 | 6/2003 |
| JP | 2004 270769 A | 9/2004 |
| JP | 2006-329430 | 12/2006 |
| SU | 542884 | 1/1977 |
| WO | 93/07410 A1 | 4/1993 |
| WO | 94/18481 A1 | 8/1994 |
| WO | 95/33942 | 12/1995 |
| WO | 98/34058 | 8/1998 |
| WO | 00/11381 A1 | 3/2000 |
| WO | 2004005833 A1 | 1/2004 |
| WO | 2004/020881 A1 | 3/2004 |
| WO | 2005/017397 A2 | 2/2005 |
| WO | 2005/114012 A1 | 12/2005 |
| WO | 2007107500 A | 9/2007 |
| WO | 2009/059057 A1 | 5/2009 |

OTHER PUBLICATIONS

International Search Report for PCT/US2008/081871 dated Jan. 29, 2009.

* cited by examiner

BUTTERFLY VALVE WITH A RIGID SEAL

CROSS-REFERENCE TO RELATED APPLICATION(S)

The following disclosure is a non-provisional application which claims priority to U.S. Provisional Application No. 60/983,999 filed Oct. 31, 2007, entitled "Butterfly Valve With a Rigid Seal" and having named inventors Yves Stefani and Roland Lucotte, and further claims priority to French Application No. 07 07659 filed Oct. 31, 2007, entitled "Butterfly Valve With a Rigid Seal" and having named inventors Yves Stefani and Roland Lucotte, the applications of which are incorporated by reference herein in their entirety.

FIELD OF THE DISCLOSURE

The present disclosure relates generally to valves. More specifically, the present disclosure relates to butterfly valves and seals therefore.

BACKGROUND

Traditionally, seals are used to prevent fluids from flowing between joints of rigid components. In particular examples, seals are used in valves and between flanges to limit fluid flow out of containment regions. Resilient seals can be used in valves. A resilient seal can be collapsed and installed within a valve body of a valve. Thereafter, a disc can be installed within the seal and an actuator rod can be engaged with the disc. The resilient seal can seal the valve and prevent leakage. However, resilient seals are typically not corrosion resistant.

Migration to corrosion resistant seals typically involves the use of a rigid material such as a fluoropolymer. However, such rigid materials are not compatible with prior designs, which rely upon the deformability of the seal for assembly.

Accordingly, there exists a need for an improved valve, and particularly seals therefore.

BRIEF DESCRIPTION OF THE DRAWINGS

The present disclosure may be better understood, and its numerous features and advantages made apparent to those skilled in the art by referencing the accompanying drawings.

DESCRIPTION OF THE PREFERRED EMBODIMENTS

Figure 1:
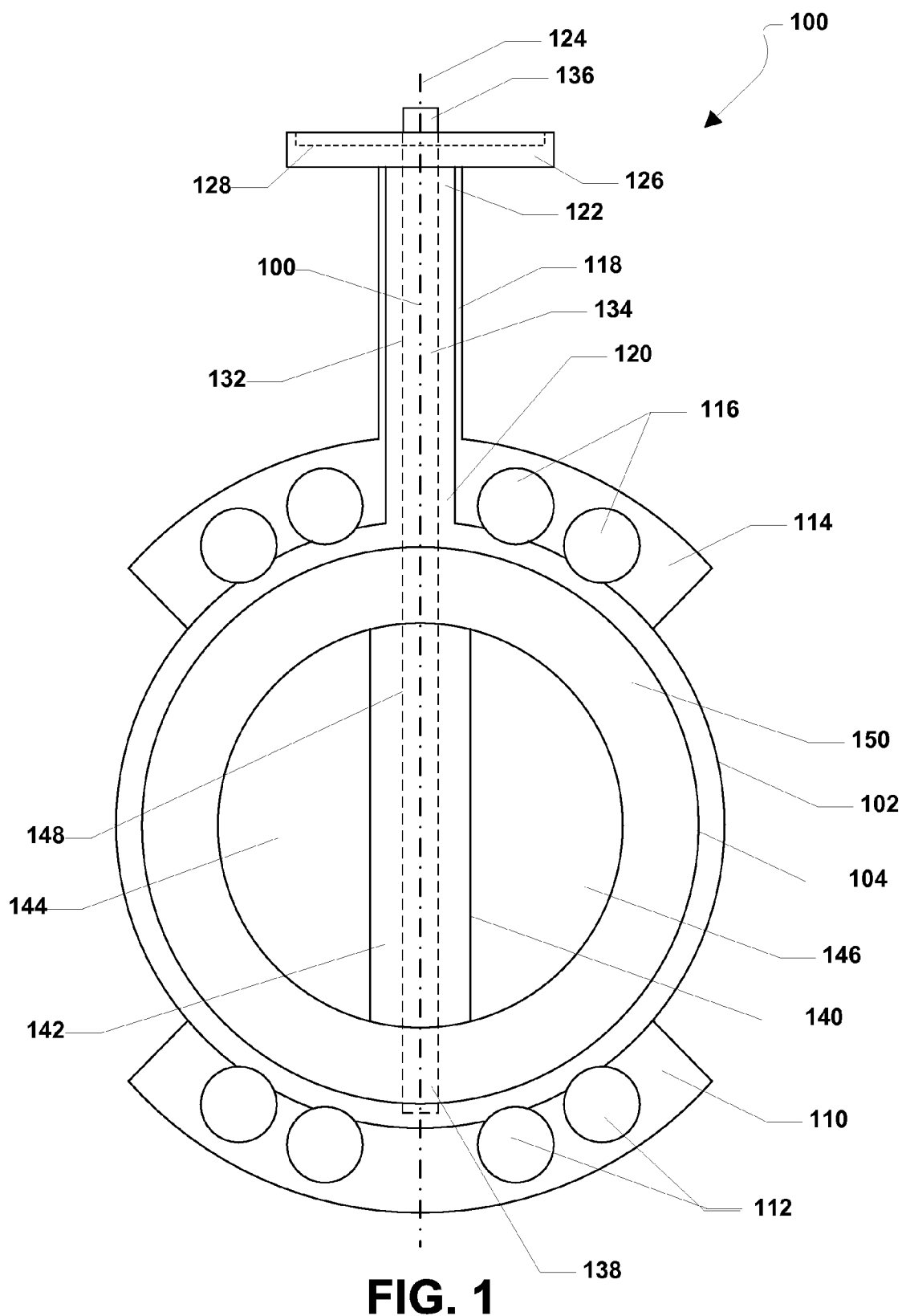
FIG. 1 is a front plan view of a butterfly valve in a closed position.
Figure 2:
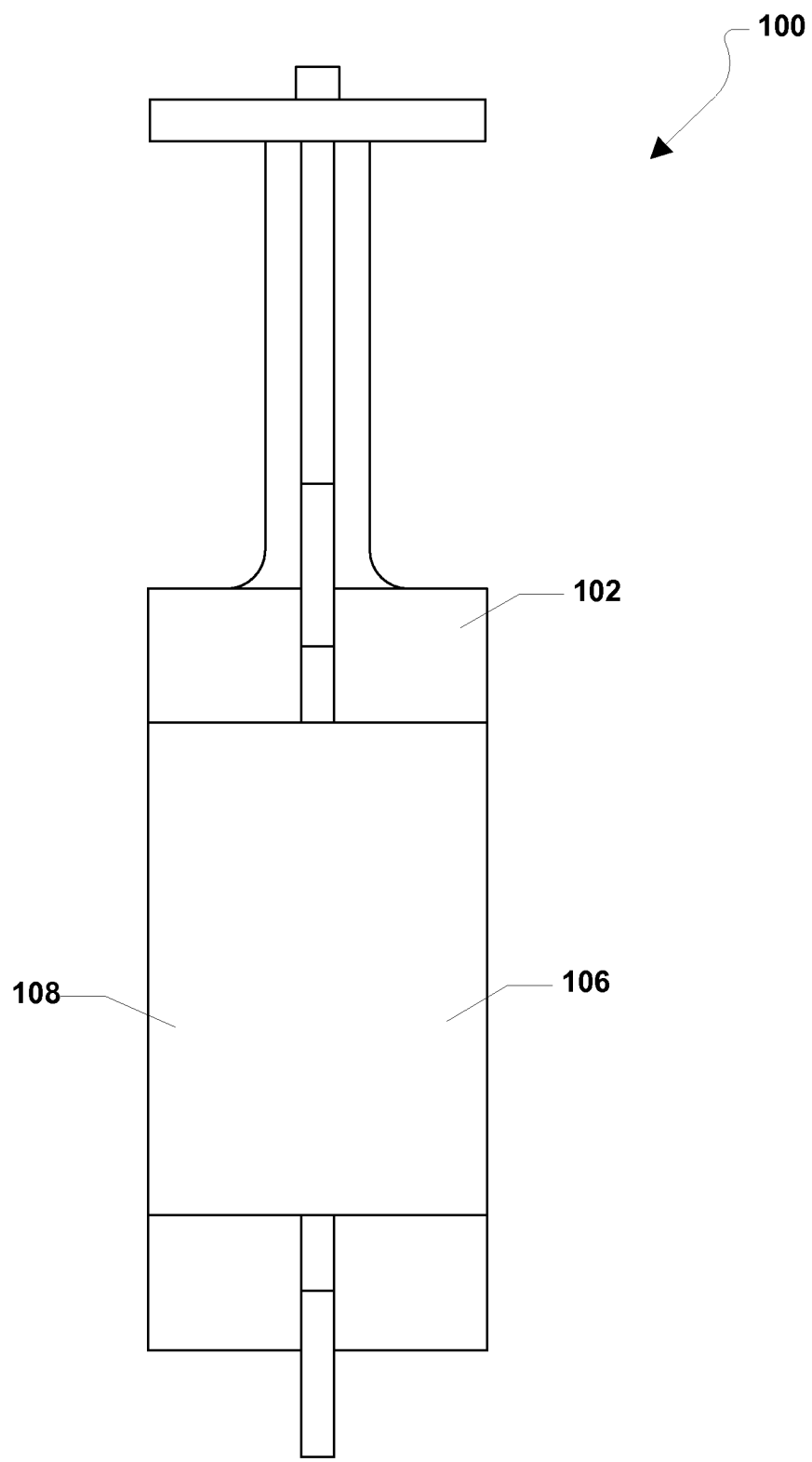
FIG. 2 is a side plan view of the butterfly valve in the closed position.

In general, a valve is disclosed and can include a valve body having a central bore for passage of fluid there through and a longitudinal axis. The valve can also include a seal installed within the valve body along the central bore. The seal can include a first seal member having an annular ring portion and a hub portion extending from the annular ring portion. The seal can also include a second seal member including an annular ring configured to engage a distal end of the hub portion and create a sealing engagement between the hub portion and the annular ring when a compressive force is applied to the first and the second seal members.

In another embodiment, a seal assembly is disclosed and can include a first seal member having an annular ring portion and a hub portion and a second seal member include an annular ring. The first seal member and the second seal member can include a complementary engagement structure that is configured to create a seal interface within a valve in which the seal assembly is installed.

In yet another embodiment, a method of modifying a valve is disclosed and can include removing a resilient seal from a valve body of the valve, inserting a first seal member of a rigid seal into the valve body, and engaging a second seal member of the rigid seal with the first seal member of the rigid seal.

Referring to FIG. 1 through FIG. 5, a butterfly valve is shown and is generally designated 100. As illustrated, the butterfly valve 100 can include a valve body 102. The valve body 102 can be hollow and generally cylindrical. As such, the valve body 102 can include a central bore 104. Further, the valve body 102 can have an upstream end 106 and a downstream end 108.

A lower mounting flange 110 can extend radially from the valve body 102. The lower mounting flange 110 can be formed with a plurality of lower mounting holes 112. An upper mounting flange 114 can extend radially from the valve body 102 substantially opposite from the lower mounting flange 110. The upper mounting flange 114 can be formed with a plurality of upper mounting holes 116.

As depicted in FIG. 1 through FIG. 4, a stem 118 can extend from the valve body 102. The stem 118 can have a proximal end 120 and a distal end 122. The proximal end 120 of the stem 118 can be joined, or integrally formed, with the valve body 102. Also, the stem 118 can extend radially from the valve body 102 along a central axis 124 of the butterfly valve 100.

Figure 3:
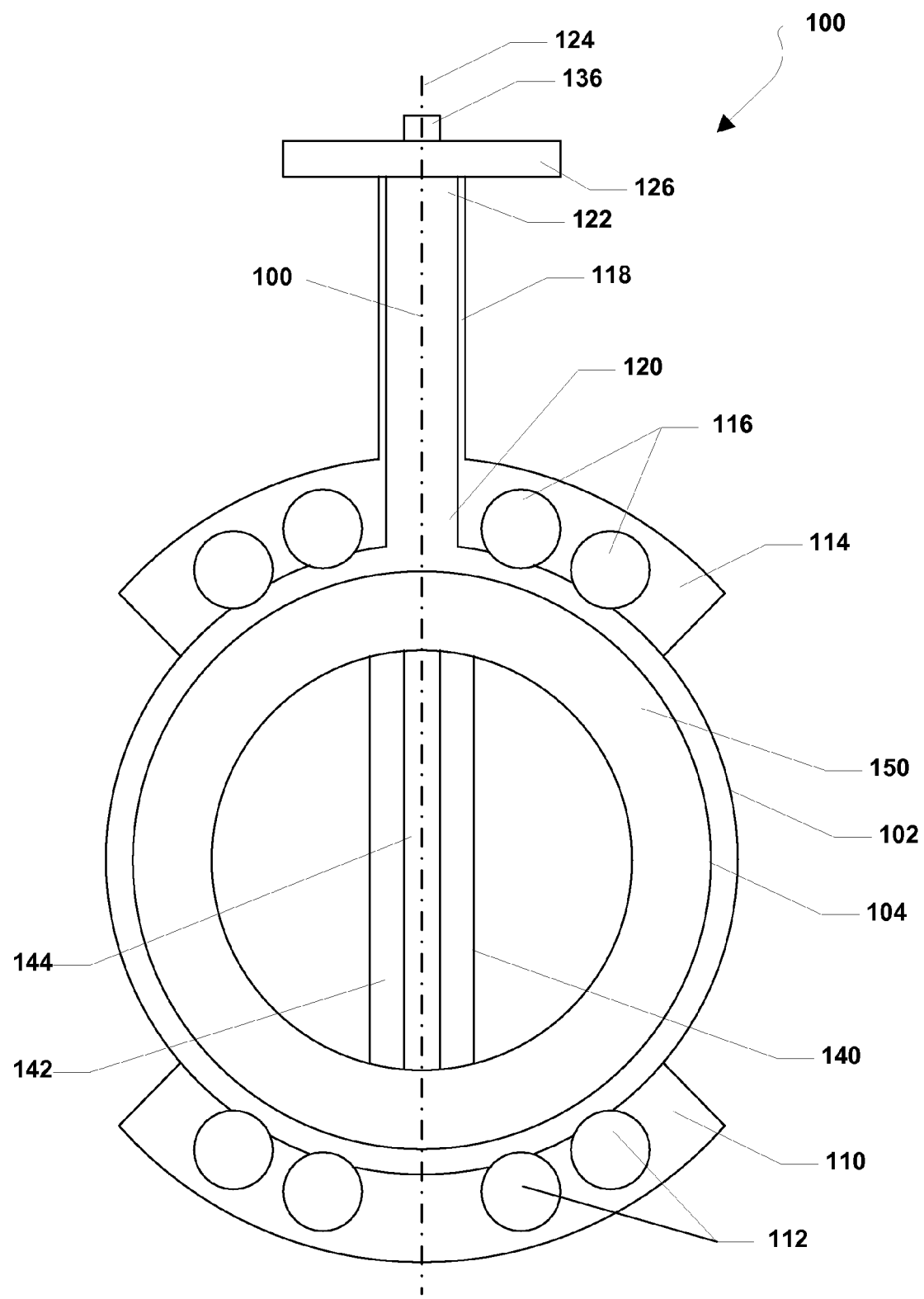
FIG. 3 is a front plan view of the butterfly valve in an open position.
Figure 4:
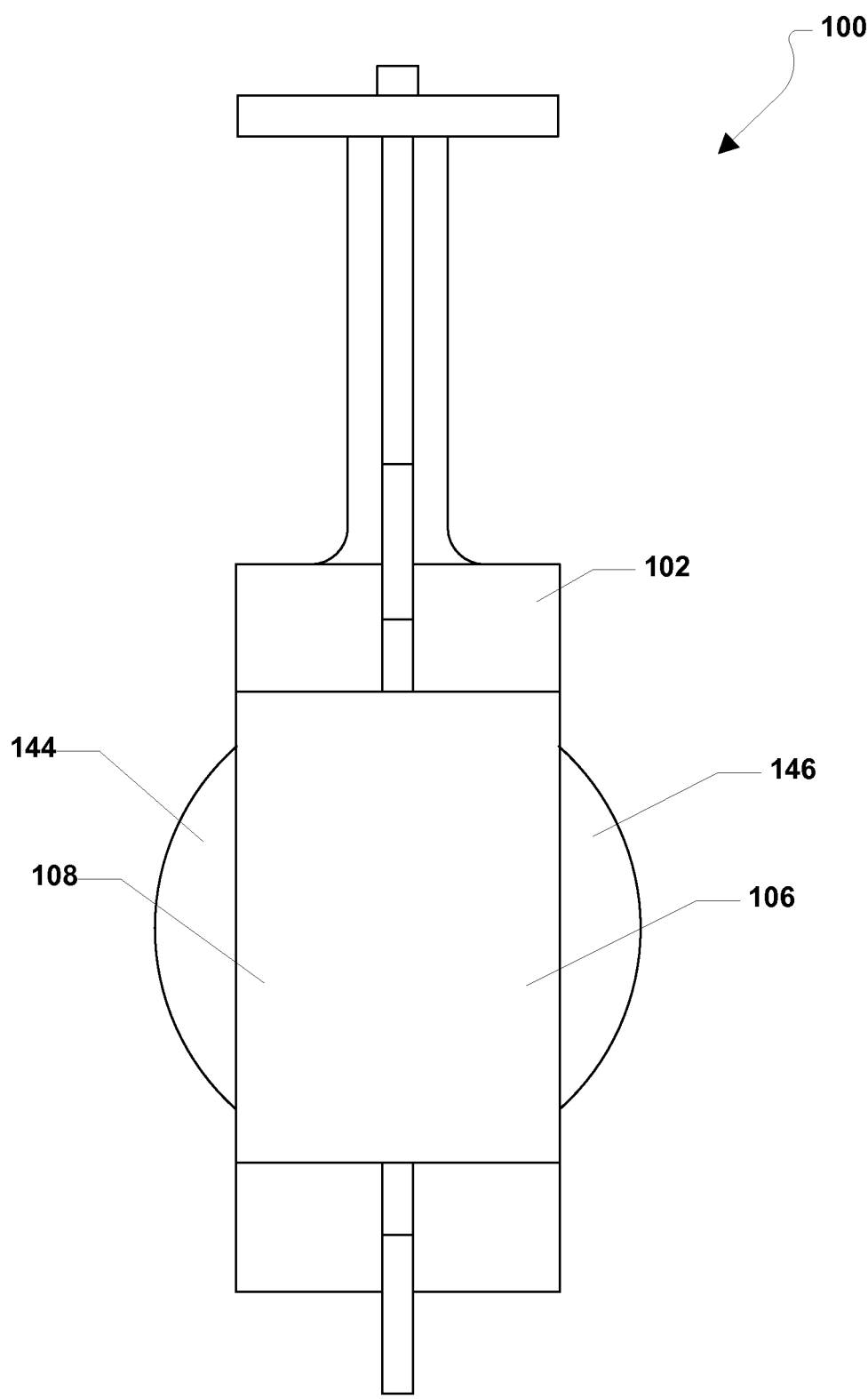
FIG. 4 is a side plan view of the butterfly valve in the open position.
Figure 5:
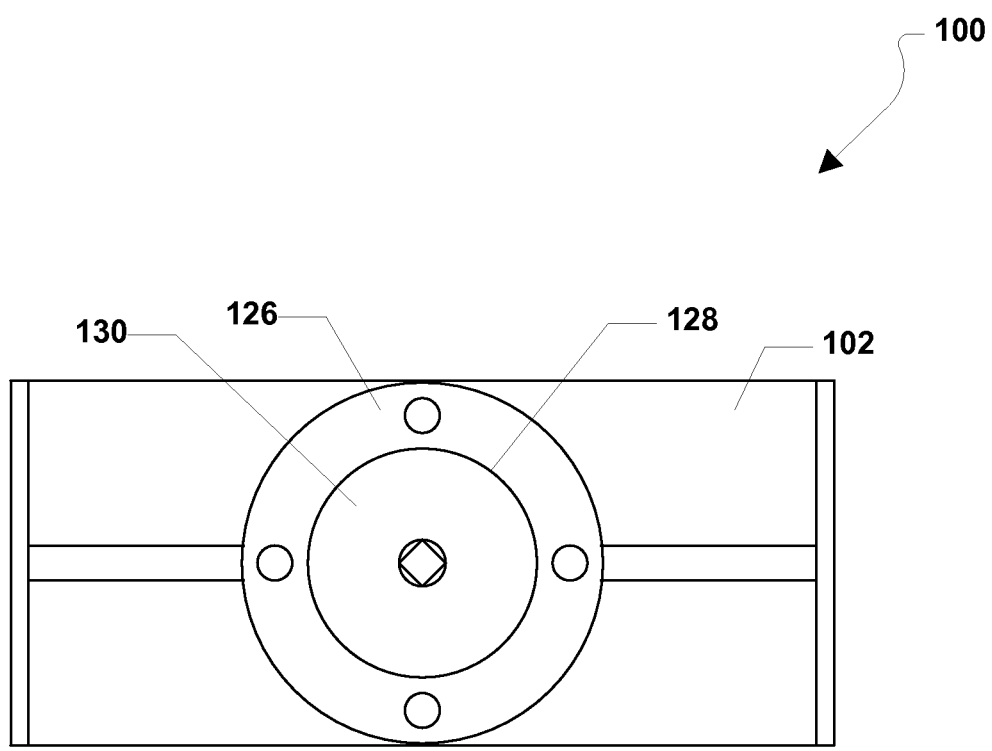
FIG. 5 is a top plan view of the butterfly valve in the close position.
Figure 6:
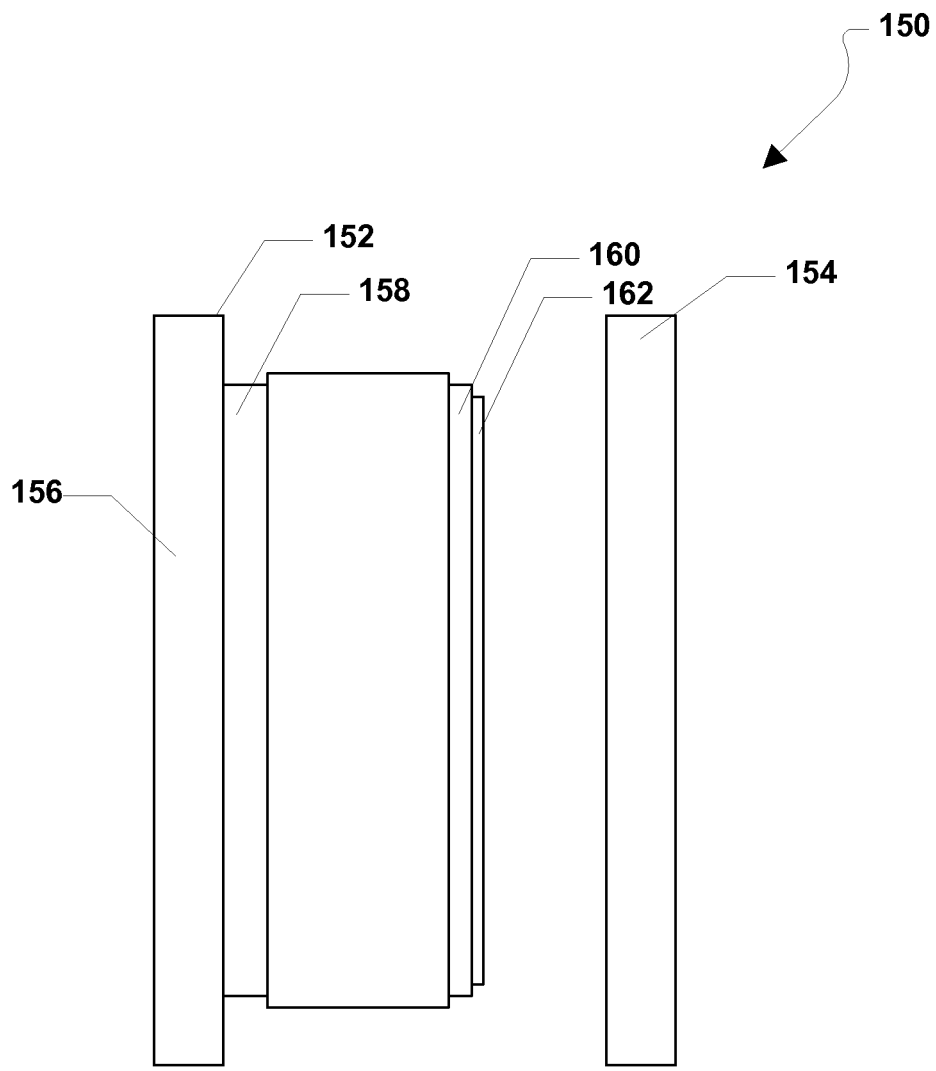
FIG. 6 is an exploded plan view of a first embodiment of a rigid seal.
Figure 7:
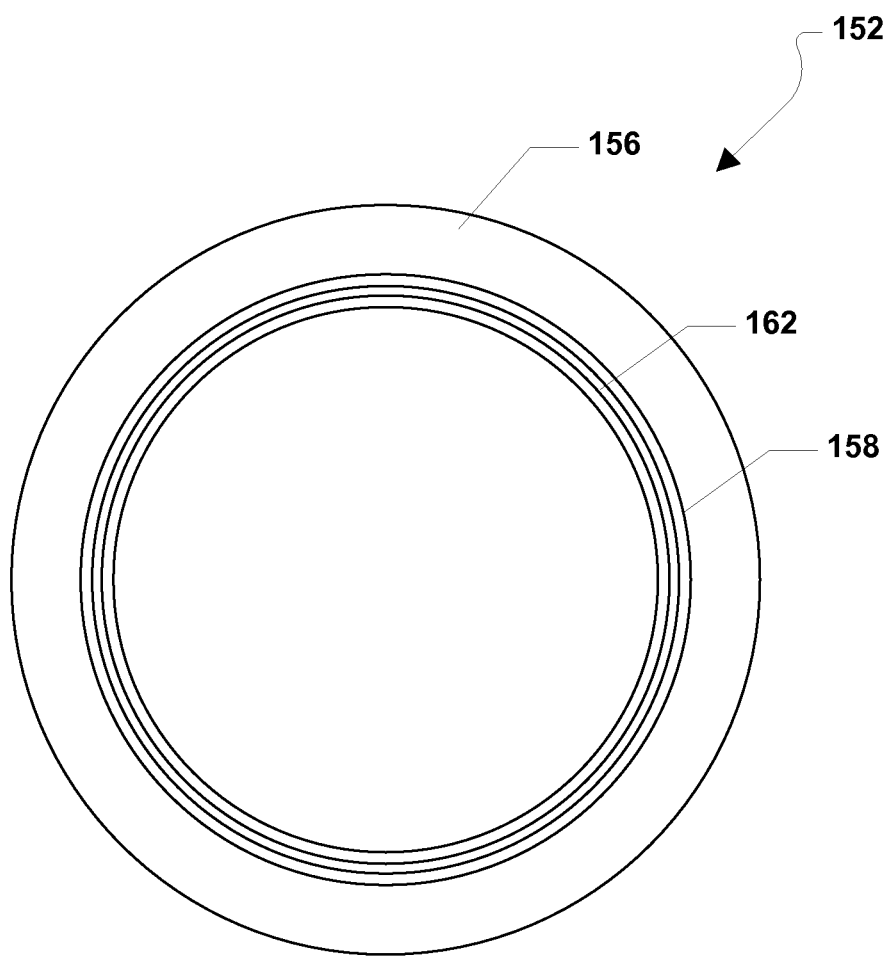
FIG. 7 is a front plan view of a first member of the rigid seal.

FIG. 1 through FIG. 5 further indicate that a mounting plate 126 can be attached to, or integrally formed with, the distal end 122 of the stem 118. As shown in FIG. 1 and FIG. 5, the mounting plate 126 can include a central pocket 128 in which a bearing 130 is disposed. Further, as illustrated in FIG. 1, the butterfly valve 100 can include a central bore 132 that extends from the central pocket 128 formed in the mounting plate 126 through the stem 118 and through the valve body 102. An actuator rod 134 can be installed within the central bore 132. The actuator rod 134 can include a proximal end 136 and distal end 138. Moreover, the actuator rod 134 can extend through the bearing 130 and through the central bore 132 within the stem 118. As shown, the proximal end 136 of the actuator rod 134 can extend slightly beyond the mounting plate 126. Further, the proximal end 136 of the actuator rod 134 can be sized and shaped to engage an actuator, a handle, or some other device configured to rotate the actuator rod 134.

FIG. 1, FIG. 3 and FIG. 4 illustrate that a valve disc 140 can be installed within the valve body 102, e.g., within the central bore 104 of the valve body 102. The valve disc 140 can include a central post 142. A first vane 144 can extend radially from the central post 142. Further, a second vane 146 can extend radially from the central post 142 in a direction substantially opposite to the first vane 144. The central post 142 of the valve disc 140 can be formed with a central bore 148. In a particular embodiment, the distal end 138 of the actuator rod 134 can extend into, and be engaged with, the central post 142 of the valve disc 140. Accordingly, as the actuator rod 134 rotates, the valve disc 140 can rotate therewith. In particular, the valve disc 140 can rotate between a closed position, shown in FIG. 1 and FIG. 2, and an open position, shown in FIG. 3 and FIG. 4. In the closed position, the valve disc 140 can substantially block fluid communication through the valve body 102, e.g., from the upstream end 106 of the valve body 102 to the downstream end 108 of the valve body 102. In the open position, the valve disc 140 can permit fluid communication through the valve body 102, e.g., from the upstream end 106 of the valve body 102 to the downstream end 108 of the valve body 102.

In a particular embodiment, as shown in FIG. 1 and FIG. 3, the butterfly valve 100 can also include a seal 150 that can be disposed within the central bore 104 formed in the valve body 102. The seal 150 can be disposed around the valve disc 140. Further, the seal 150 can be a rigid seal, e.g., a seal made from a substantially rigid polymer material.

The valve disc 140, when closed, can engage the seal 150 and substantially prevent fluid communication through the valve. In a particular embodiment, the seal provided by the engagement of the valve disc 140 and the seal 150 can provide a sealing pressure, or withstand a pressure, of at least ten (10) bars. In another embodiment, the seal provided by the engagement of the valve disc 140 and the seal 150 can withstand a pressure of at least fifteen (15) bars. In yet another embodiment, the seal provided by the engagement of the valve disc 140 and the seal 150 can withstand a pressure of at least twenty (20) bars. In still another embodiment, the seal provided by the engagement of the valve disc 140 and the seal 150 can withstand a pressure of at least twenty-five (25) bars. In another embodiment, the seal provided by the engagement of the valve disc 140 and the seal 150 may not withstand a pressure greater than thirty (30) bars.

In a particular embodiment, the seal 150 can be made from a substantially rigid corrosion resistant polymer. The corrosion resistant polymer can be a fluoropolymer. An exemplary fluoropolymer includes a polymer formed from a fluorine substituted olefin monomer or a polymer including at least one monomer selected from the group consisting of vinylidene fluoride, vinylfluoride, tetrafluoroethylene, hexafluoropropylene, trifluoroethylene, chlorotrifluoroethylene, or a mixture of such fluorinated monomers.

An exemplary fluoropolymer may include a polymer, a polymer blend or a copolymer including one or more of the above monomers, such as, for example, fluorinated ethylene propylene (FEP), ethylene-tetrafluoroethylene (ETFE), poly tetrafluoroethylene-perfluoropropylvinylether (PFA), poly tetrafluoroethylene-perfluoromethylvinylether (MFA), polytetrafluoroethylene (PTFE), polyvinylidene fluoride (PVDF), ethylene chlorotrifluoroethylene (ECTFE), polychlorotrifluoroethylene (PCTFE), or tetrafluoroethylene-hexafluoropropylene-vinylidene fluoride (THV).

In particular, the fluoropolymer may be polytetrafluoroethylene (PTFE), such as a modified PTFE. In an example, the modified PTFE is a copolymer of tetrafluoroethylene and a vinyl ether, such as perfluoropropylvinylether (PPVE). In an embodiment, the modified PTFE includes at least about 0.01 wt % perfluoropropylvinylether (PPVE). In another example, the modified PTFE includes not greater than about 5.0 wt % PPVE, such as not greater than about 3.0 wt % or not greater than about 1.5 wt % PPVE. While particular embodiments of modified PTFE that include PPVE are melt processable, a particularly useful modified PTFE includes a small amount of PPVE such that the modified PTFE is not melt processable and instead is typically solution deposited and sintered. Particular examples of modified PTFE are commercially available, such as TFM1700 available from Dyneon, Teflon® NXT available from DuPont®, and M1-11 available from Daikon.

Referring now to FIG. 6 through FIG. 10, details concerning the construction of the seal 150 can be seen. As shown, the seal 150 can include a first seal member 152 and a second seal member 154. The first seal member 152 can include an annular ring portion 156 and a hub portion 158 extending there from. The hub portion 158 can be hollow and generally cylindrical. The annular ring portion 156 can include an outer diameter, $OD_R$, and the hub portion 158 can include an outer diameter, $OD_H$. In a particular embodiment, $OD_R$ is greater than $OD_H$.

The hub portion 158 can include a distal end 160. The distal end 160 of the hub portion 158 can be formed with a first sealing element 162. For example, the first sealing element 162 can be a tongue that extends from the face of the distal end 160 of the hub portion 158. The tongue can be generally ring shaped and can extend substantially perpendicular from the face of the distal end 160 of the hub portion 158.

Figure 8:
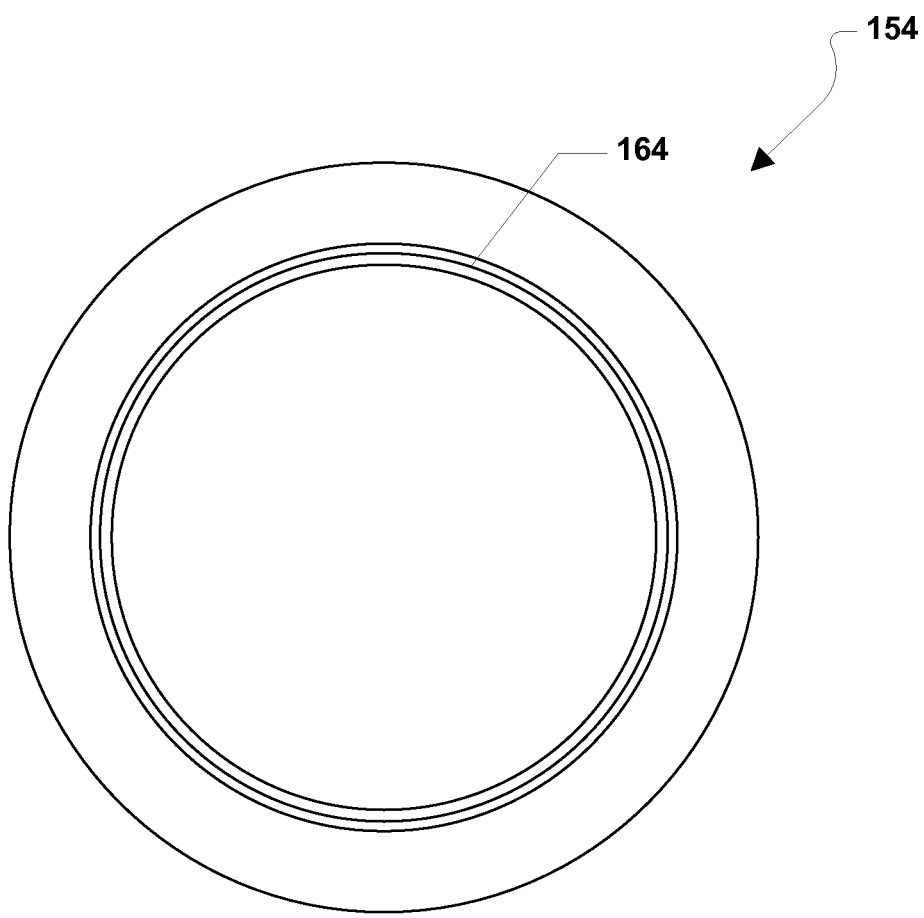
FIG. 8 is a back plan view of a second member of the rigid seal.

In a particular embodiment, as shown in FIG. 8, the second seal member 154 can include a generally annular ring. Further, the second seal member 154 can include a second sealing element 164 formed in a face of the second seal member 154. The second sealing element 164 formed in the second seal member 154 is configured engage the first sealing element 162 formed on the first seal member 152. In a particular embodiment, the second sealing element 164 can be a groove which is sized and shaped to receive a tongue, e.g., the first sealing element 162. Accordingly, the first sealing element 162 and the second sealing element 164 can form a complementary engagement structure that is configured to provide a seal interface when the seal 150 is installed within the valve 100 and compressed along a longitudinal axis. As shown, the first sealing element 162 and the second sealing element 164 can be generally rectangular.

Figure 9:
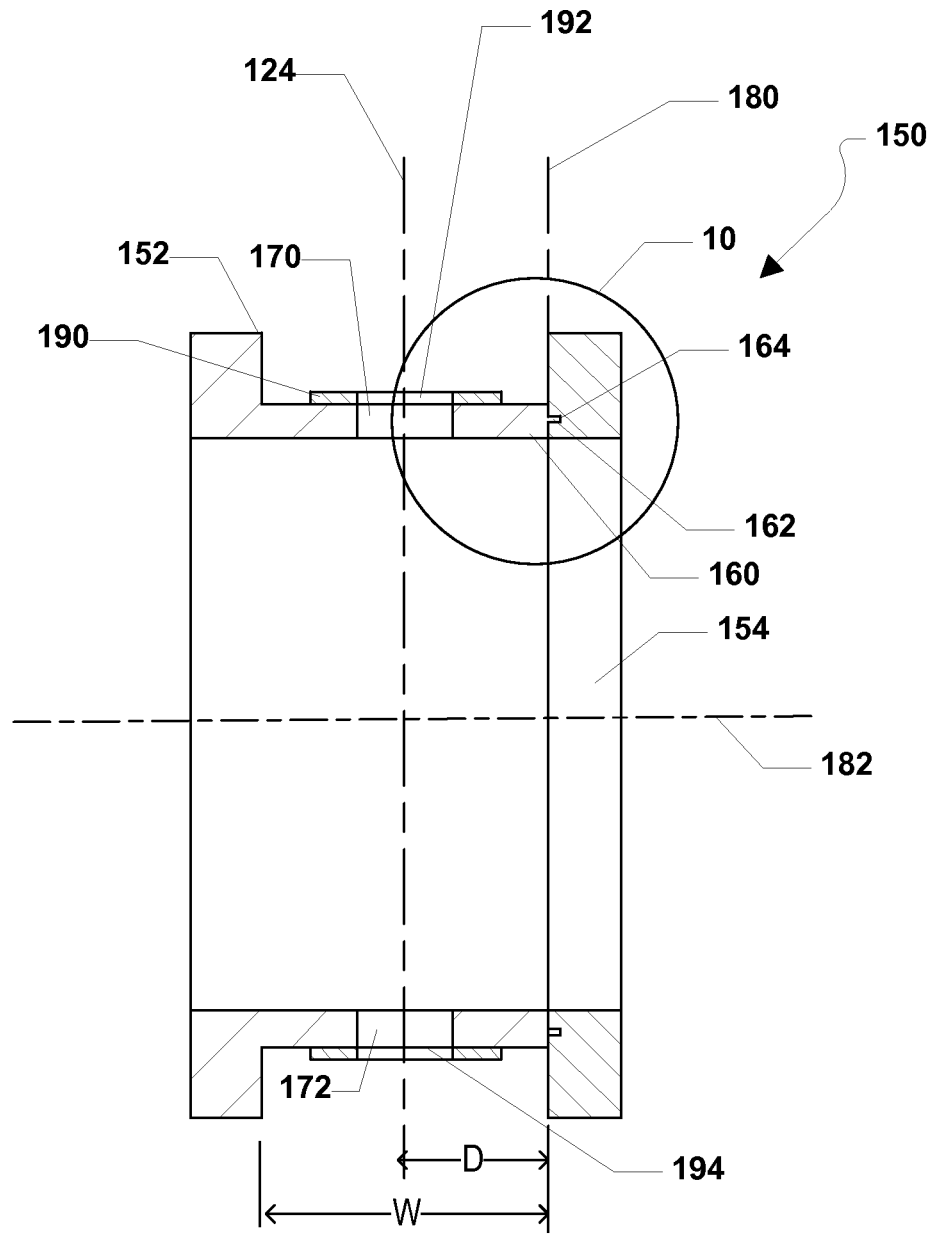
FIG. 9 is a cross-section view of the rigid seal.
Figure 10:
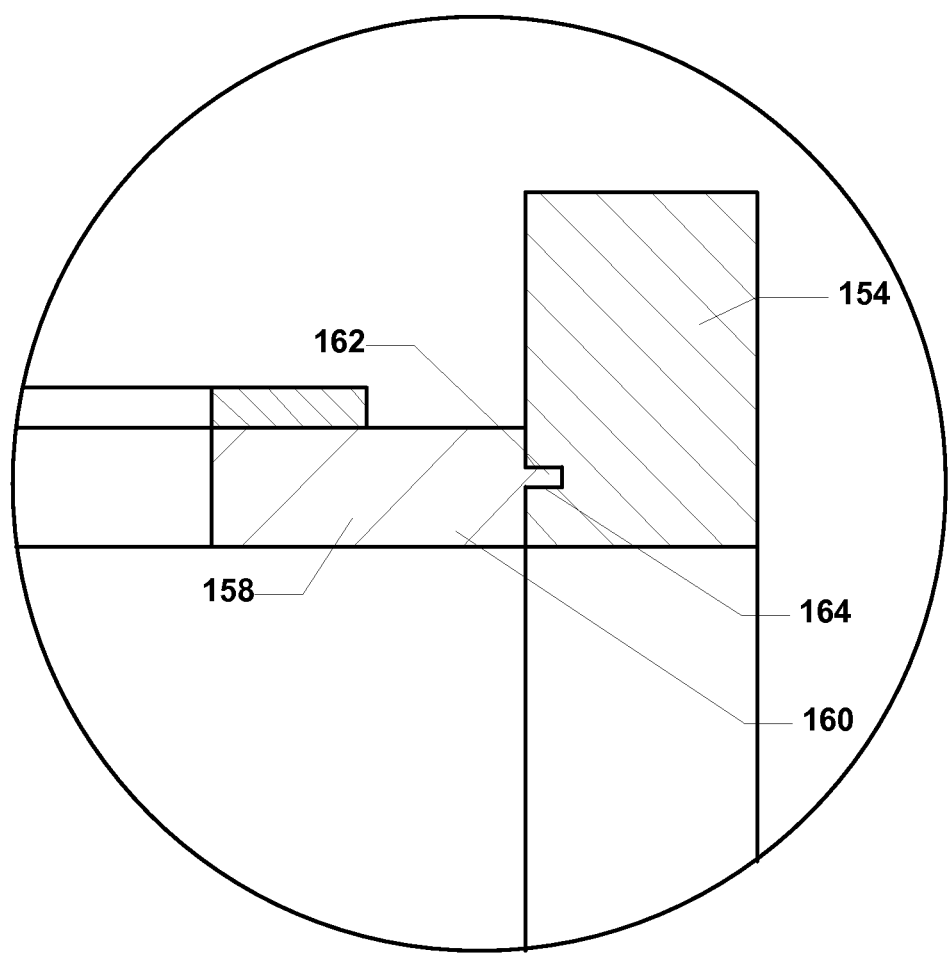
FIG. 10 is a detailed view of the rigid seal taken at circle 10 in FIG. 9.

Referring to FIG. 9 and FIG. 10, the assembled seal 150 is shown in cross-section. When assembled, the first seal member 152 can be engaged with the second seal member 154. Specifically, the first sealing element 162 of the first seal member 152 can be engaged with the second sealing element 164 of the second seal member 154. For example, the tongue extending from the distal end 160 of the hub portion 158 of the first seal member 152 can extend into and engage the groove formed in the second seal member 154.

As shown in FIG. 9, the seal 150 can include a first radial bore 170 and a second radial bore 172 formed in the hub portion 158 of the first seal member 152. The first radial bore 170 and the second radial bore 172 are sized and shaped to engage a rod, e.g., the actuator rod 134 (FIG. 1) described herein. The radial bores 170, 172 can engage the actuator rod 134 (FIG. 1) in an interference fit. Further, the interference fit between the radial bores 170, 172 and the actuator rod 134 (FIG. 1) can create a seal there between and substantially prevent fluid communication through the radial bores 170, 172.

As shown in FIG. 9, the radial bores 170, 172 can be aligned with the central axis 124 of the butterfly valve 100 (FIG. 1). In a particular embodiment, the hub portion 158 of the first seal member can have a width, W. The central axis 124 of the butterfly valve 100 can lie approximately along the midpoint ±2% of W. A seal interface 180 established by the first seal member 152 and the second seal member 154 can be spaced a distance, D, from the central axis 124. In a particular embodiment, D is equal to one-half of the width, W, of the hub portion 158 of the first seal member (D=0.5×W). Further, the first sealing element 162 and the second sealing element 164 can provide sealing engagement, when the first seal member 152 and the second seal member 154 when a compressive force is applied to the first seal member 152 and the second seal member 154 along a longitudinal axis 182.

FIG. 9 further indicates that a resilient member 190 can circumscribe the hub portion 158 of the first seal member 152. The resilient member 190 can include a first radial bore 192 and a second radial bore 194. The radial bores 192, 194 formed in the resilient member 190 can be aligned with the radial bores 170, 172 formed in the hub portion 158 of the first seal member 152. When assembled within the butterfly valve 100 (FIG. 1), the resilient member 190 can assist in properly aligning the seal 150 within the butterfly valve 100.

Figure 11:
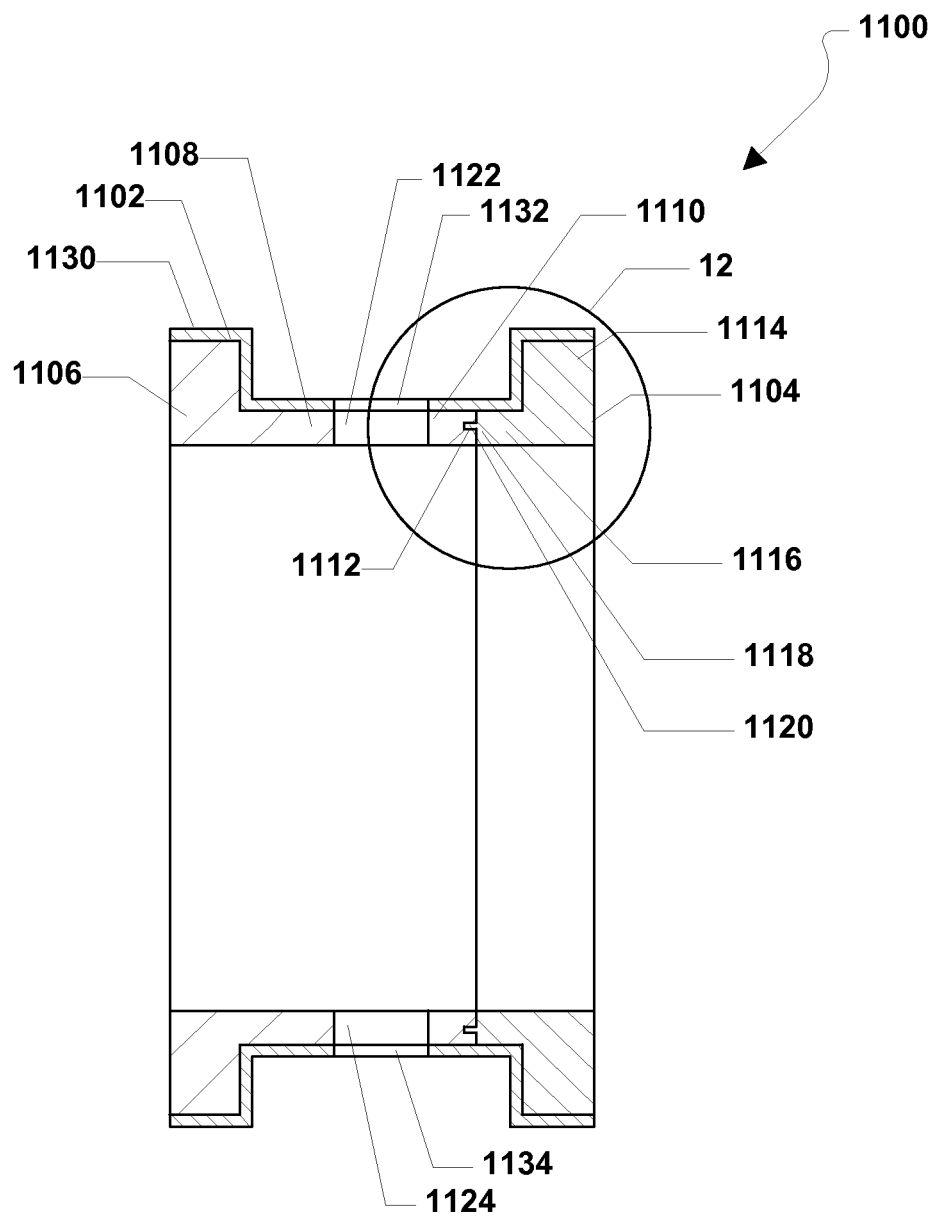
FIG. 11 is a cross-section view of a second embodiment of a rigid seal.
Figure 12:
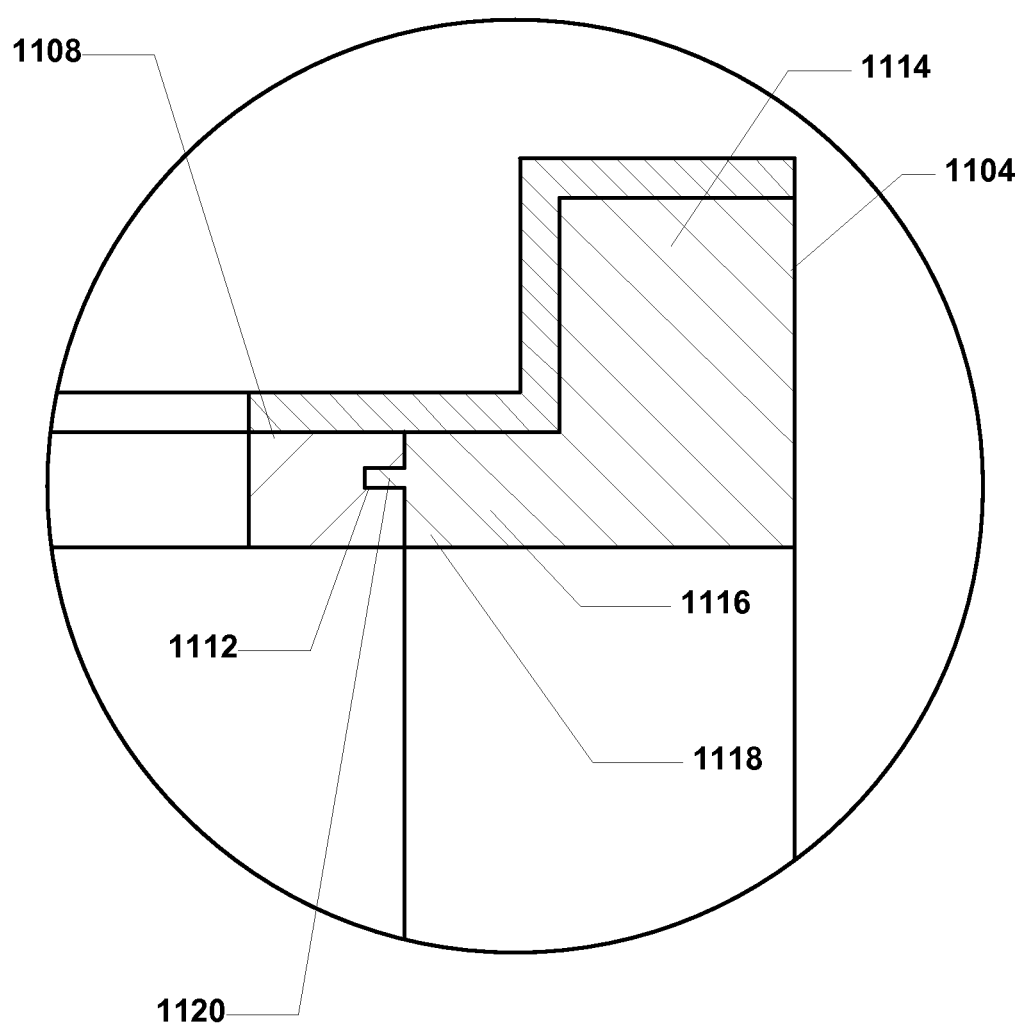
FIG. 12 is a detailed view of the second embodiment of the rigid seal taken at circle 12 in FIG. 11.

Referring to FIG. 11 and FIG. 12, a second embodiment of a seal is shown and is generally designated 1100. As shown, the seal 1100 can include a first seal member 1102 and a second seal member 1104. The first seal member 1102 can include an annular ring portion 1106 and a hub portion 1108 extending there from. The hub portion 1108 can be hollow and generally cylindrical. Further, the hub portion 1108 can include a distal end 1110. The distal end 1110 of the hub portion 1108 can be formed with a first sealing element 1112. For example, the first sealing element 1112 can be a groove that extends into the face of the distal end 1110 of the hub portion 1108.

In a particular embodiment, the second seal member 1104 can include an annular ring portion 1114 and a hub portion 1116 extending there from. The hub portion 1116 can be hollow and generally cylindrical. Also, the hub portion 1116 can include a distal end 1118. The distal end 1118 of the hub portion 1116 can be formed with a second sealing element 1120 that can extend from the distal end 1118 of the hub portion 1116 of the second seal member 1104. The second sealing element 1120 is configured engage the first sealing element 1112 formed in the first seal member 1102. In a particular embodiment, the second sealing element 1120 can be a tongue that is sized and shaped to extend into a groove, e.g., the first sealing element 1112. Accordingly, the first sealing element 1112 and the second sealing element 1120 can form a complementary engagement structure that is configured to provide a seal interface when the seal 1100 is installed within a valve and compressed along a longitudinal axis.

As shown in FIG. 11, the seal 1100 can include a first radial bore 1122 and a second radial bore 1124 formed in the hub portion 1108 of the first seal member 1102. The first radial bore 1122 and the second radial bore 1124 are sized and shaped to engage an actuator rod of a butterfly valve in an interference fit.

FIG. 11 further indicates that a resilient member 1130 can circumscribe the seal 1100. As shown, the resilient member 1130 can circumscribe the outer periphery of the first seal member 1102 and the outer periphery of the second seal member 1104. The resilient member 1130 can include a first radial bore 1132 and a second radial bore 1134. The radial bores 1132, 1134 formed in the resilient member 1130 can be aligned with the radial bores 1122, 1124 formed in the hub portion 1108 of the first seal member 1102. The resilient member 1130 can assist in properly aligning the seal 1100 within a butterfly valve.

Figure 13:
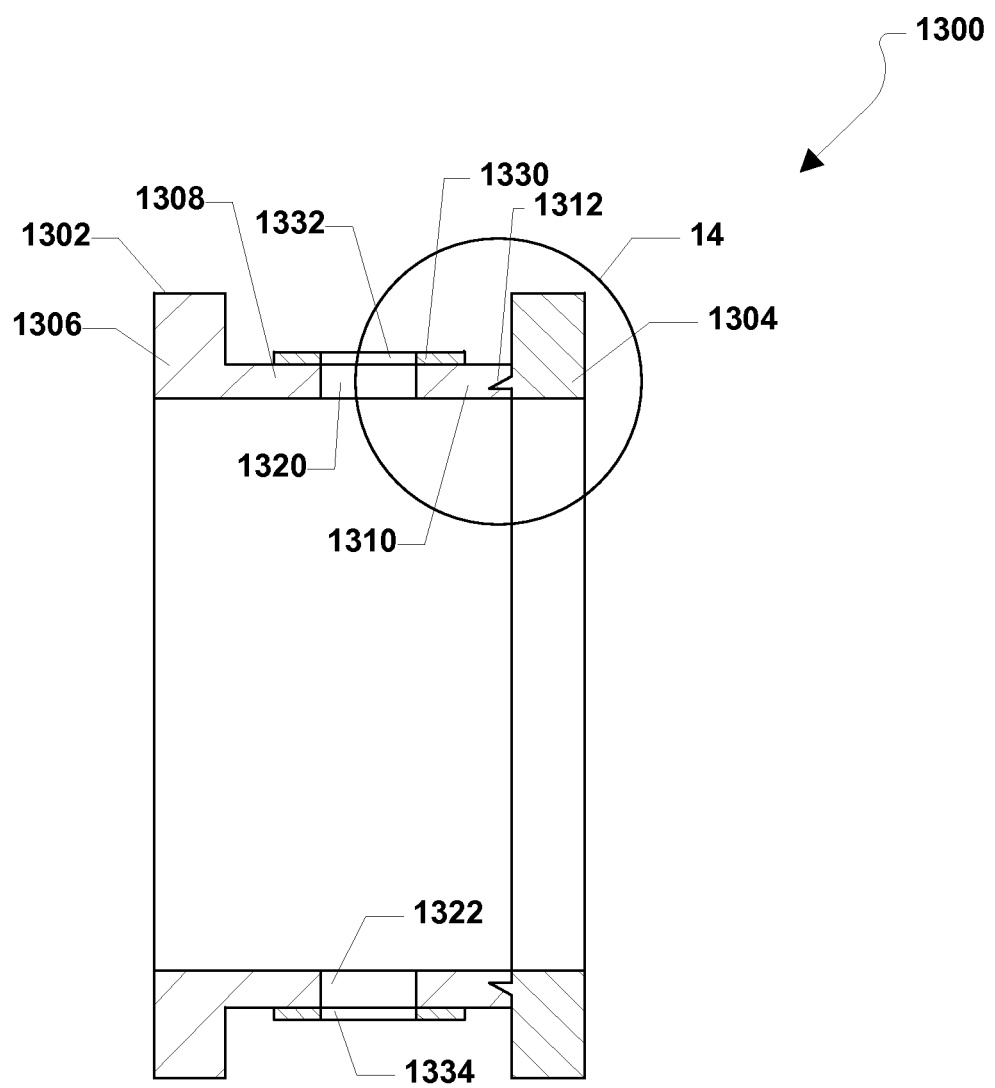
FIG. 13 is a cross-section view of a third embodiment of a rigid seal.
Figure 14:
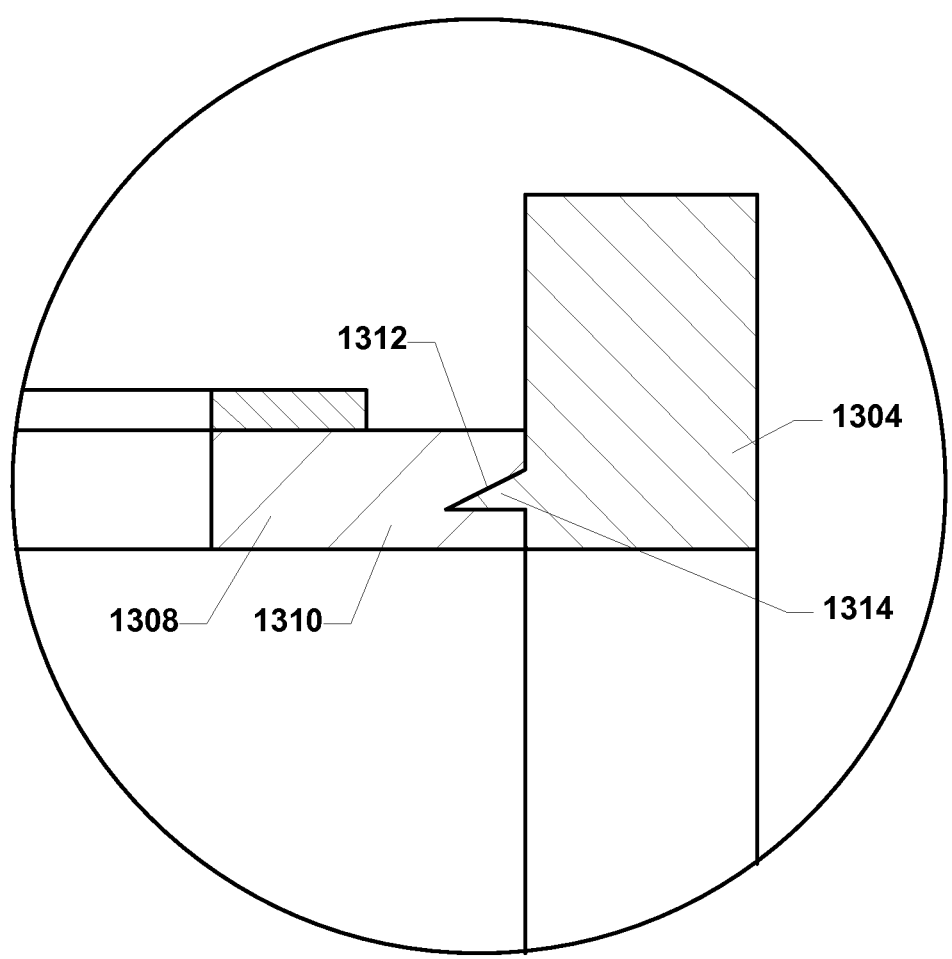
FIG. 14 is a detailed view of the third embodiment of the rigid seal taken at circle 14 in FIG. 13.

Referring to FIG. 13 and FIG. 14, a third embodiment of a seal is shown and is generally designated 1300. As shown, the seal 1300 can include a first seal member 1302 and a second seal member 1304. The first seal member 1302 can include an annular ring portion 1306 and a hub portion 1308 extending there from. The hub portion 1308 can be hollow and generally cylindrical. Further, the hub portion 1308 can include a distal end 1310. The distal end 1310 of the hub portion 1308 can be formed with a first sealing element 1312. For example, the first sealing element 1312 can be a groove that extends into the face of the distal end 1310 of the hub portion 1308. In a particular embodiment, and as shown in greater detail in FIG. 14, the first sealing element 1312 can be a generally wedge-shaped groove.

In a particular embodiment, the second seal member 1304 can be a generally annular ring. Further, the second seal member 1304 can include a second sealing element 1314 extending from a face of the second seal member 1304. The second sealing element 1314 is configured engage the first sealing element 1312 formed in the first seal member 1302. The second sealing element 1314 can be a tongue that is sized and shaped to extend into a groove, e.g., the first sealing element 1312. Accordingly, the first sealing element 1312 and the second sealing element 1314 can form a complementary engagement structure that is configured to provide a seal interface when the seal 1300 is installed within a valve and compressed along a longitudinal axis.

As shown in FIG. 14, the second sealing element 1314 can be a generally wedge-shaped tongue that can be fitted into the first sealing element 1312. In a particular embodiment, the wedge-shaped groove and the wedge-shaped tongue include angled surfaces. Accordingly, the angled surfaces are angled in such a manner that wedge-shaped groove can engage the wedge-shaped tongue and deform the wedge-shaped tongue inward. Alternatively, the angled surfaces can be angled in such a manner that the wedge-shaped groove can engage the wedge-shaped tongue and deform the wedge-shaped tongue outward.

As shown in FIG. 13, the seal 1300 can include a first radial bore 1320 and a second radial bore 1322 formed in the hub portion 1308 of the first seal member 1302. The first radial bore 1320 and the second radial bore 1322 are sized and shaped to engage an actuator rod of a butterfly valve in an interference fit.

FIG. 13 further indicates that a resilient member 1330 can circumscribe the hub portion 1308 of the first seal member 1302. The resilient member 1330 can include a first radial bore 1332 and a second radial bore 1334. The radial bores 1332, 1334 formed in the resilient member 1330 can be aligned with the radial bores 1320, 1322 formed in the hub portion 1308 of the first seal member 1302. The resilient member 1330 can assist in properly aligning the seal 1300 within a butterfly valve.

Figure 15:
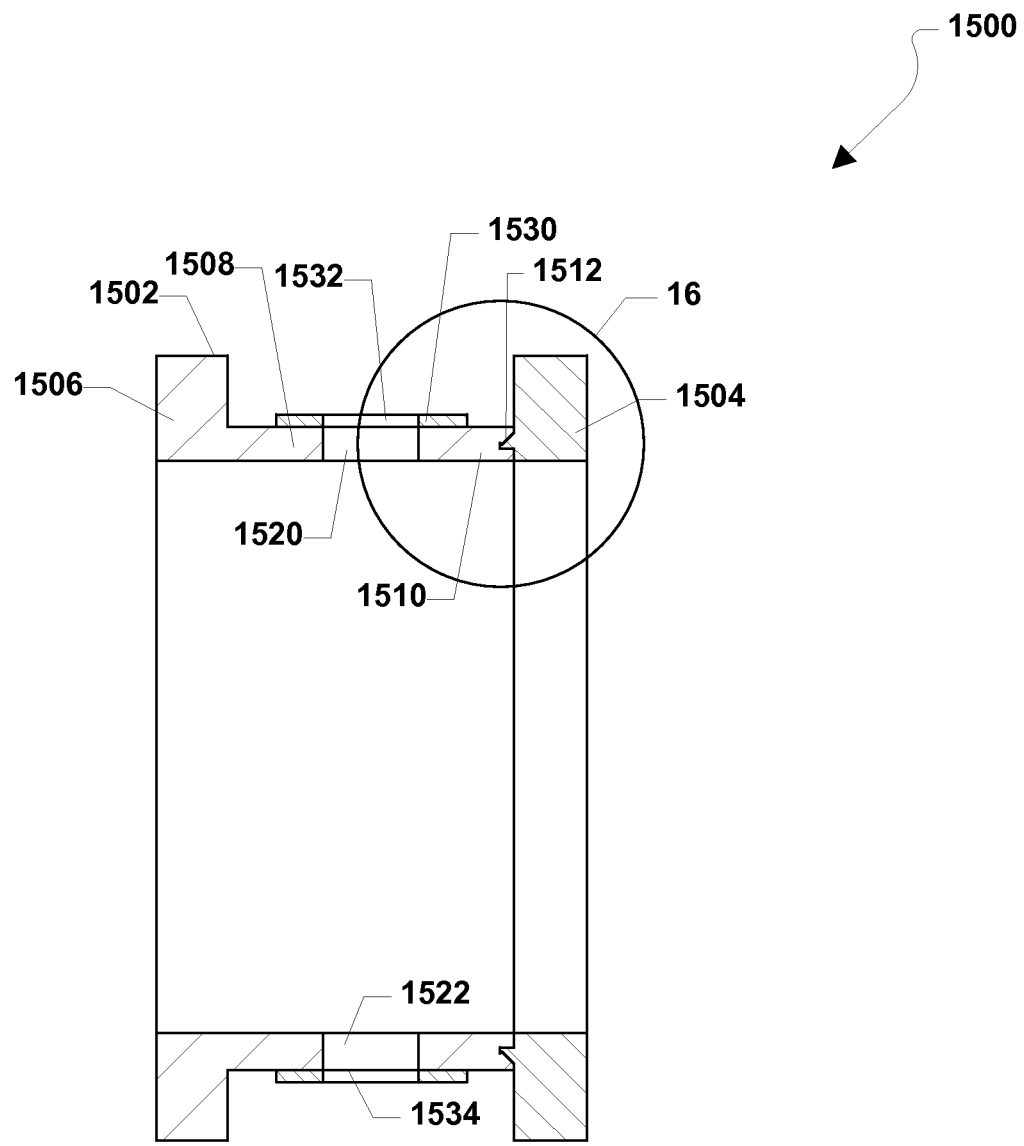
FIG. 15 is a cross-section view of a fourth embodiment of a rigid seal.
Figure 16:
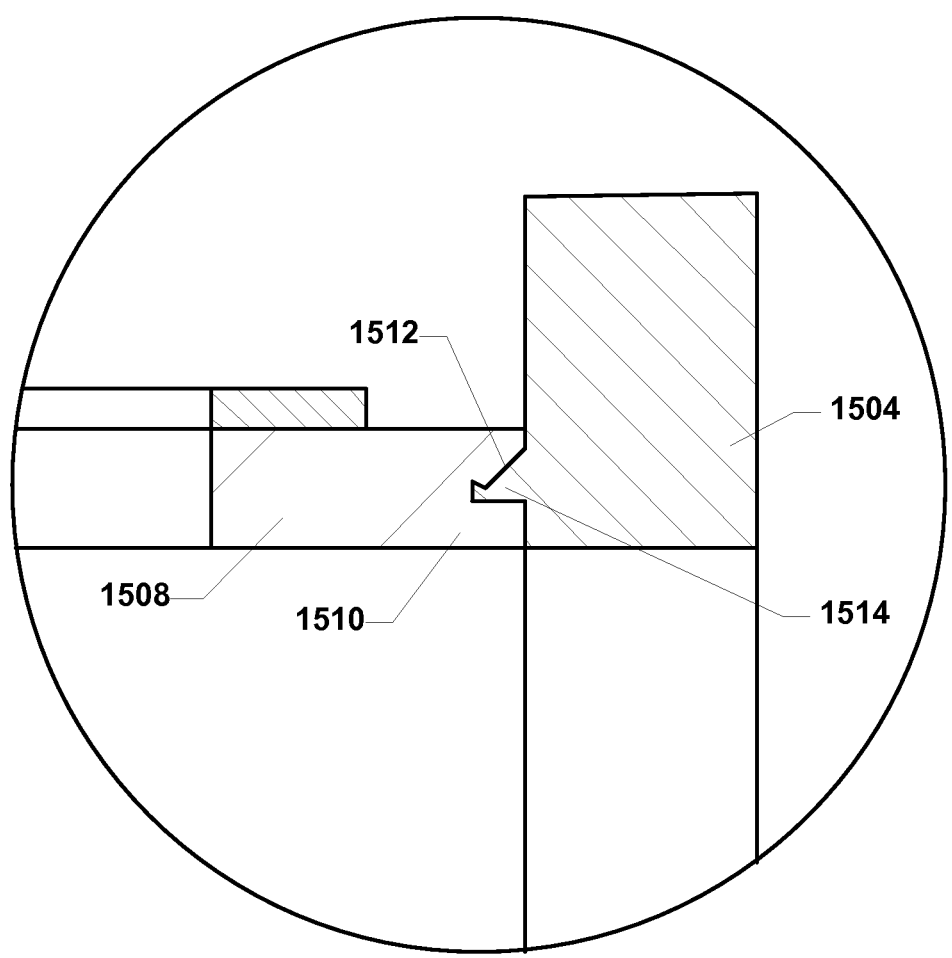
FIG. 16 is a detailed view of the fourth embodiment of the rigid seal taken at circle 16 in FIG. 15.

Referring to FIG. 15 and FIG. 16, a fourth embodiment of a seal is shown and is generally designated 1500. As shown, the seal 1500 can include a first seal member 1502 and a second seal member 1504. The first seal member 1502 can include an annular ring portion 1506 and a hub portion 1508 extending there from. The hub portion 1508 can be hollow and generally cylindrical. Further, the hub portion 1508 can include a distal end 1510. The distal end 1510 of the hub portion 1508 can be formed with a first sealing element 1512. For example, the first sealing element 1512 can be a groove that extends into the face of the distal end 1510 of the hub portion 1508. In a particular embodiment, and as shown in greater detail in FIG. 16, the first sealing element 1512 can be a generally K-shaped groove.

In a particular embodiment, the second seal member 1504 can be a generally annular ring. Further, the second seal member 1504 can include a second sealing element 1514 extending from a face of the second seal member 1504. The second sealing element 1514 is configured engage the first sealing element 1512 formed in the first seal member 1502. The second sealing element 1514 can be a tongue that is sized and shaped to extend into a groove, e.g., the first sealing element 1512. Accordingly, the first sealing element 1512 and the second sealing element 1514 can form a complementary engagement structure that is configured to provide a seal interface when the seal 1500 is installed within a valve and compressed along a longitudinal axis. As shown in FIG. 16, the second sealing element 1514 can be a generally K-shaped tongue that can be snapped into the first sealing element 1512.

As shown in FIG. 15, the seal 1500 can include a first radial bore 1520 and a second radial bore 1522 formed in the hub portion 1508 of the first seal member 1502. The first radial bore 1520 and the second radial bore 1522 are sized and shaped to engage an actuator rod of a butterfly valve in an interference fit.

FIG. 15 further indicates that a resilient member 1530 can circumscribe the hub portion 1508 of the first seal member 1502. The resilient member 1530 can include a first radial bore 1532 and a second radial bore 1534. The radial bores 1532, 1534 formed in the resilient member 1530 can be aligned with the radial bores 1520, 1522 formed in the hub portion 1508 of the first seal member 1502. The resilient member 1530 can assist in properly aligning the seal 1500 within a butterfly valve.

Figure 17:
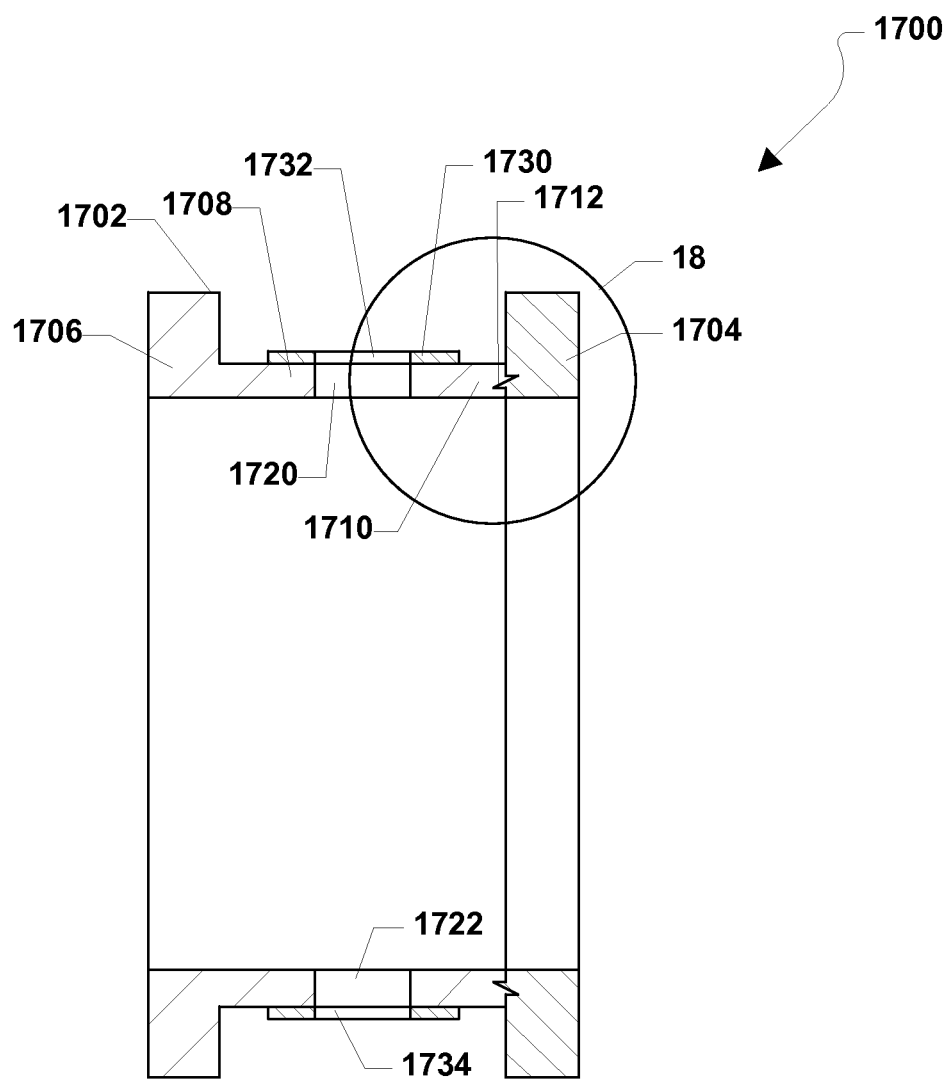
FIG. 17 is a cross-section view of a fifth embodiment of a rigid seal.
Figure 18:
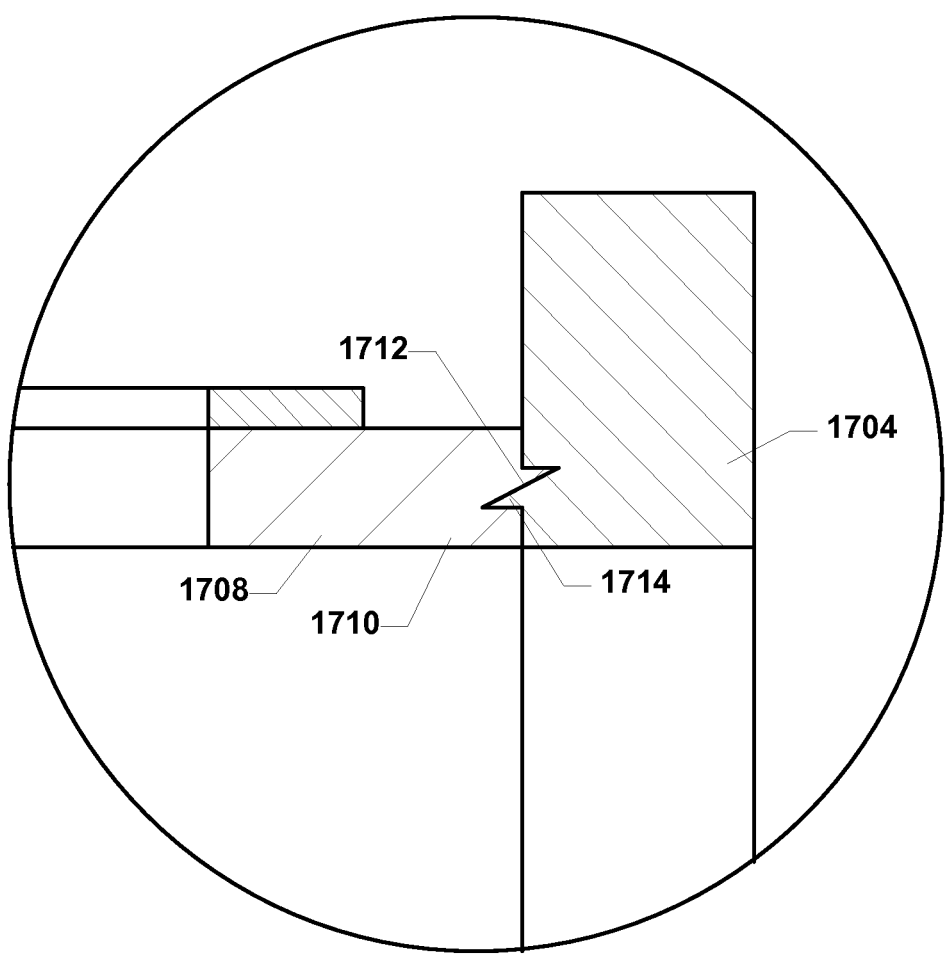
FIG. 18 is a detailed view of the fifth embodiment of the rigid seal taken at circle 18 in FIG. 17.

Referring to FIG. 17 and FIG. 18, a fifth embodiment of a seal is shown and is generally designated 1700. As shown, the seal 1700 can include a first seal member 1702 and a second seal member 1704. The first seal member 1702 can include an annular ring portion 1706 and a hub portion 1708 extending there from. The hub portion 1708 can be hollow and generally cylindrical. Further, the hub portion 1708 can include a distal end 1710. The distal end 1710 of the hub portion 1708 can be formed with a first sealing element 1712. For example, the first sealing element 1712 can be a groove that extends into the face of the distal end 1710 of the hub portion 1708. In a particular embodiment, and as shown in greater detail in FIG. 18, the first sealing element 1712 can include a generally wedge-shaped groove that is circumscribed by a generally wedge-shaped tongue.

In a particular embodiment, the second seal member 1704 can be a generally annular ring. Further, the second seal member 1704 can include a second sealing element 1714 extending from a face of the second seal member 1704. The second sealing element 1714 is configured engage the first sealing element 1712 formed in the first seal member 1702. The second sealing element 1714 can be a tongue/groove arrangement that is sized and shaped to fit into, and engage, an opposing tongue/groove arrangement, e.g., the first sealing element 1712. Accordingly, the first sealing element 1712 and the second sealing element 1714 can form a complementary engagement structure that is configured to provide a seal interface when the seal 1700 is installed within a valve and compressed along a longitudinal axis. As shown in FIG. 18, the second sealing element 1714 can be a generally wedge-shaped tongue that is circumscribed by a wedge-shaped groove that can be fitted into the first sealing element 1712.

As shown in FIG. 17, the seal 1700 can include a first radial bore 1720 and a second radial bore 1722 formed in the hub portion 1708 of the first seal member 1702. The first radial bore 1720 and the second radial bore 1722 are sized and shaped to engage an actuator rod of a butterfly valve in an interference fit.

FIG. 17 further indicates that a resilient member 1730 can circumscribe the hub portion 1708 of the first seal member 1702. The resilient member 1730 can include a first radial bore 1732 and a second radial bore 1734. The radial bores 1732, 1734 formed in the resilient member 1730 can be aligned with the radial bores 1720, 1722 formed in the hub portion 1708 of the first seal member 1702. The resilient member 1730 can assist in properly aligning the seal 1700 within a butterfly valve.

Figure 19:
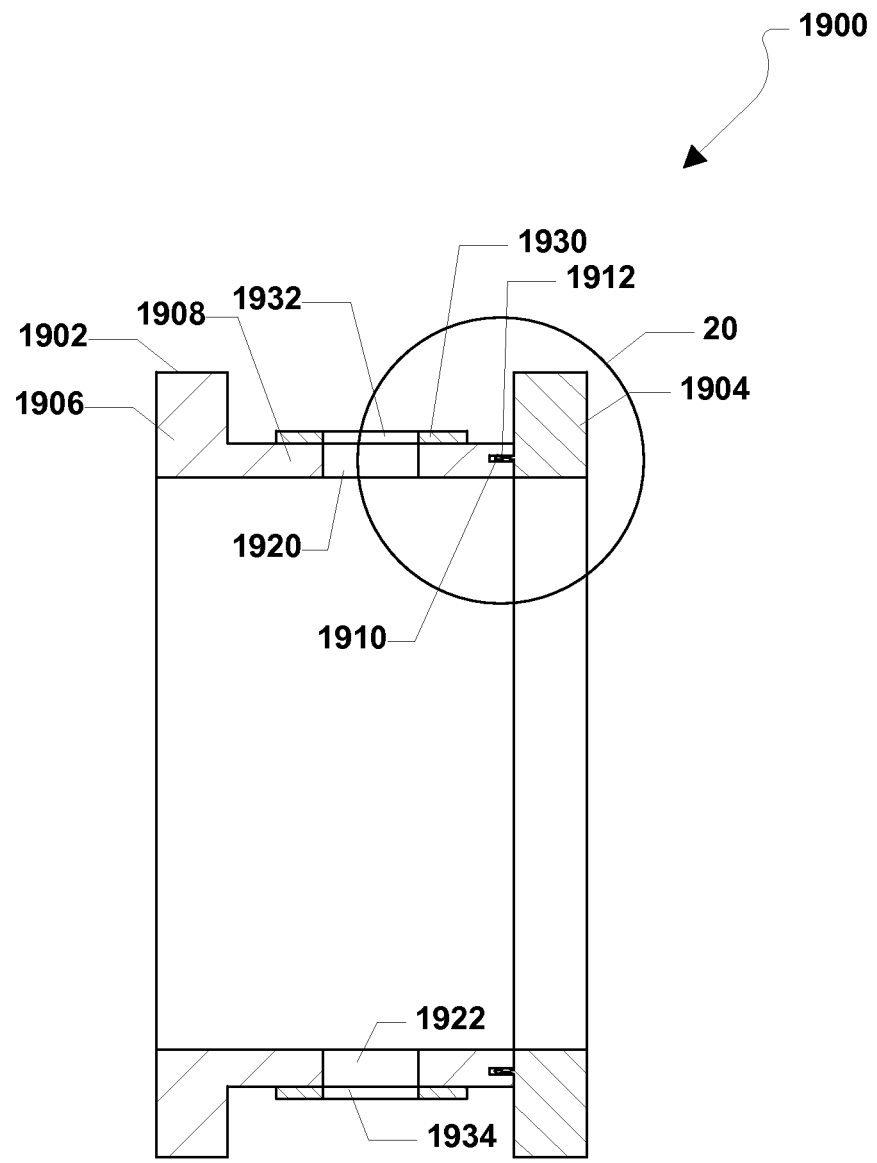
FIG. 19 is a cross-section view of a sixth embodiment of a rigid seal.
Figure 20:
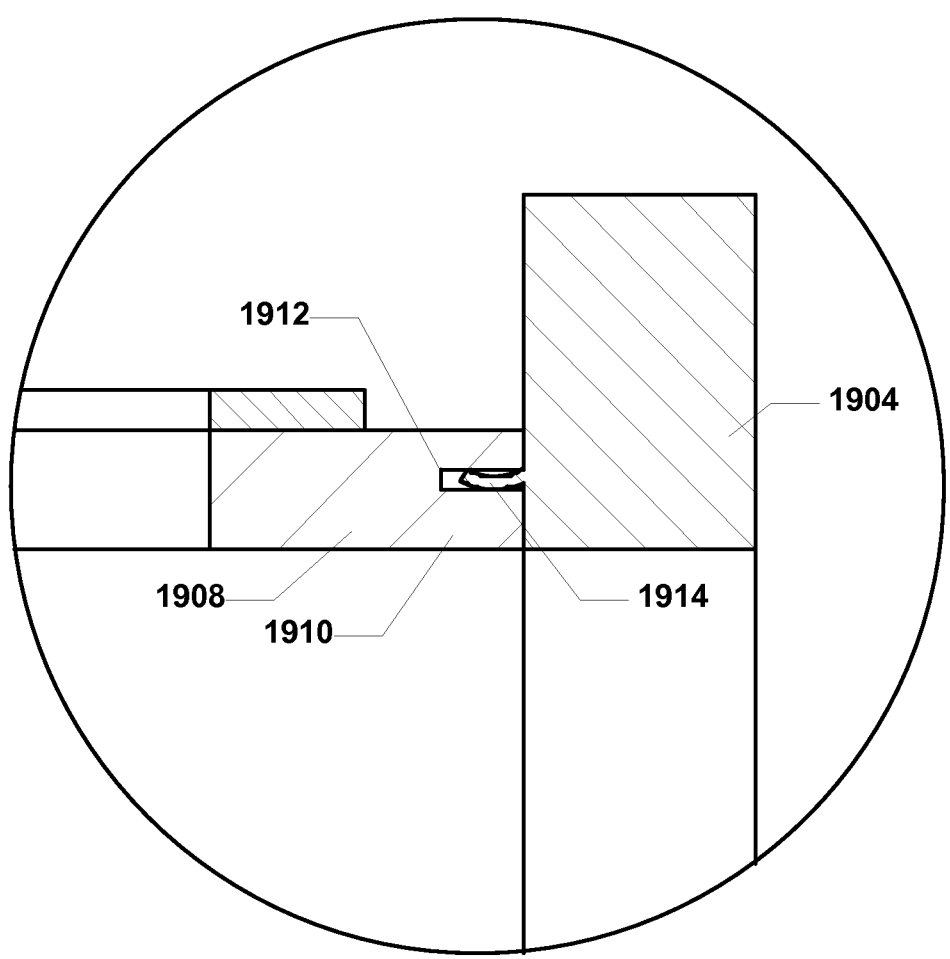
FIG. 20 is a detailed view of the sixth embodiment of the rigid seal taken at circle 20 in FIG. 19.

Referring to FIG. 19 and FIG. 20, a sixth embodiment of a seal is shown and is generally designated 1900. As shown, the seal 1900 can include a first seal member 1902 and a second seal member 1904. The first seal member 1902 can include an annular ring portion 1906 and a hub portion 1908 extending there from. The hub portion 1908 can be hollow and generally cylindrical. Further, the hub portion 1908 can include a distal end 1910. The distal end 1910 of the hub portion 1908 can be formed with a first sealing element 1912. For example, the first sealing element 1912 can be a groove that extends into the face of the distal end 1910 of the hub portion 1908. In a particular embodiment, and as shown in greater detail in FIG.

20, the first sealing element 1912 can be generally rectangular groove formed in the face of the distal end 1910 of the hub portion 1908.

In a particular embodiment, the second seal member 1904 can be a generally annular ring. Further, the second seal member 1904 can include a second sealing element 1914 extending from a face of the second seal member 1904. The second sealing element 1914 is configured engage the first sealing element 1912 formed in the first seal member 1902. The second sealing element 1914 can be a tongue/groove arrangement that is sized and shaped to fit into, and engage, and opposing tongue/groove arrangement, e.g., the first sealing element 1912. Accordingly, as shown in FIG. 20, the second sealing element 1914 can be a generally curved flange that extends from the face of the second seal member 1904. As shown in FIG. 20, the second sealing element 1914 can be fitted into the first sealing element 1912. Further, the second sealing element 1914 can be slightly deformed, i.e., slightly flattened, by the first sealing element 1912 as the second sealing element 1914 is inserted into the first sealing element 1912.

As shown in FIG. 19, the seal 1900 can include a first radial bore 1920 and a second radial bore 1922 formed in the hub portion 1908 of the first seal member 1902. The first radial bore 1920 and the second radial bore 1922 are sized and shaped to engage an actuator rod of a butterfly valve in an interference fit.

FIG. 19 further indicates that a resilient member 1930 can circumscribe the hub portion 1908 of the first seal member 1902. The resilient member 1930 can include a first radial bore 1932 and a second radial bore 1934. The radial bores 1932, 1934 formed in the resilient member 1930 can be aligned with the radial bores 1920, 1922 formed in the hub portion 1908 of the first seal member 1902. The resilient member 1930 can assist in properly aligning the seal 1900 within a butterfly valve.

Figure 21:
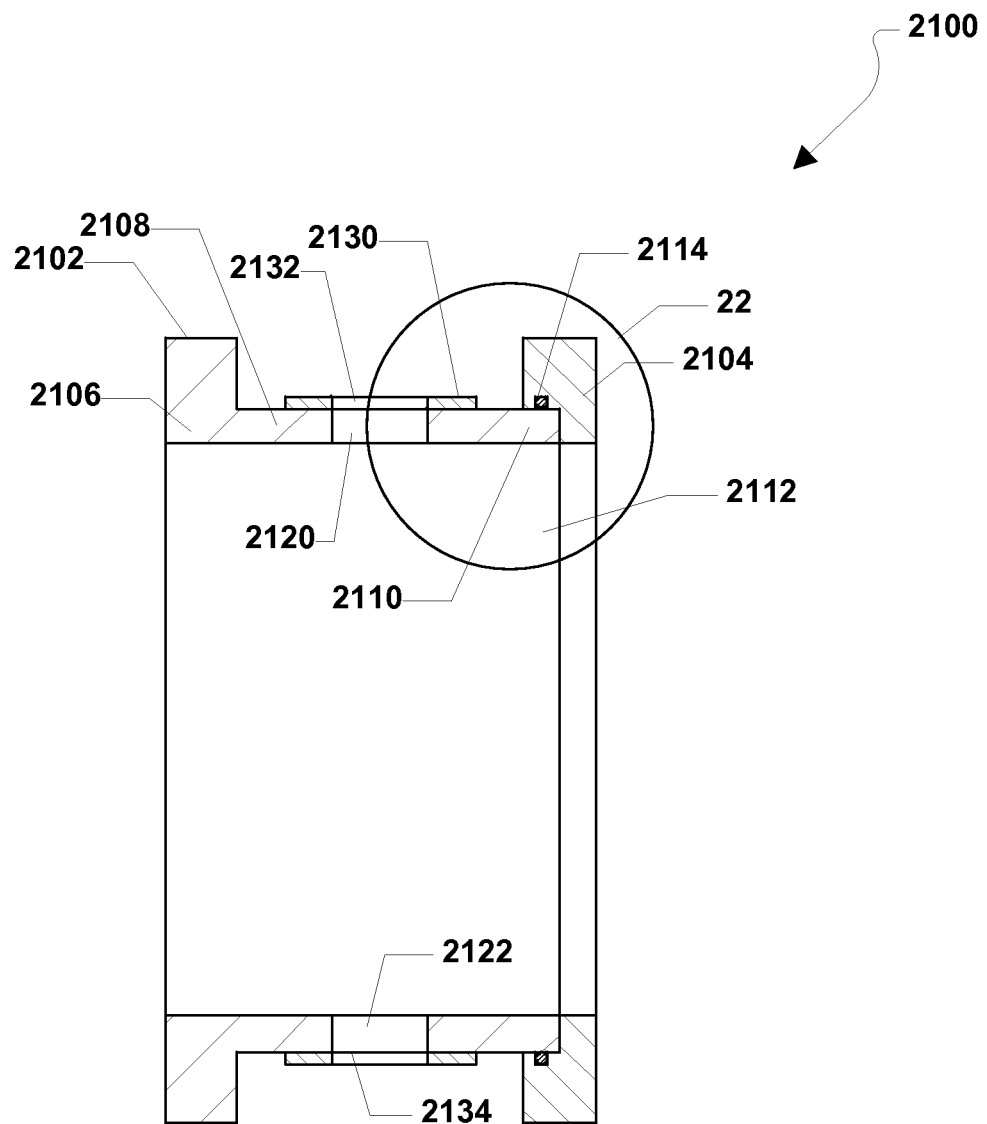
FIG. 21 is a cross-section view of a seventh embodiment of a rigid seal.
Figure 22:
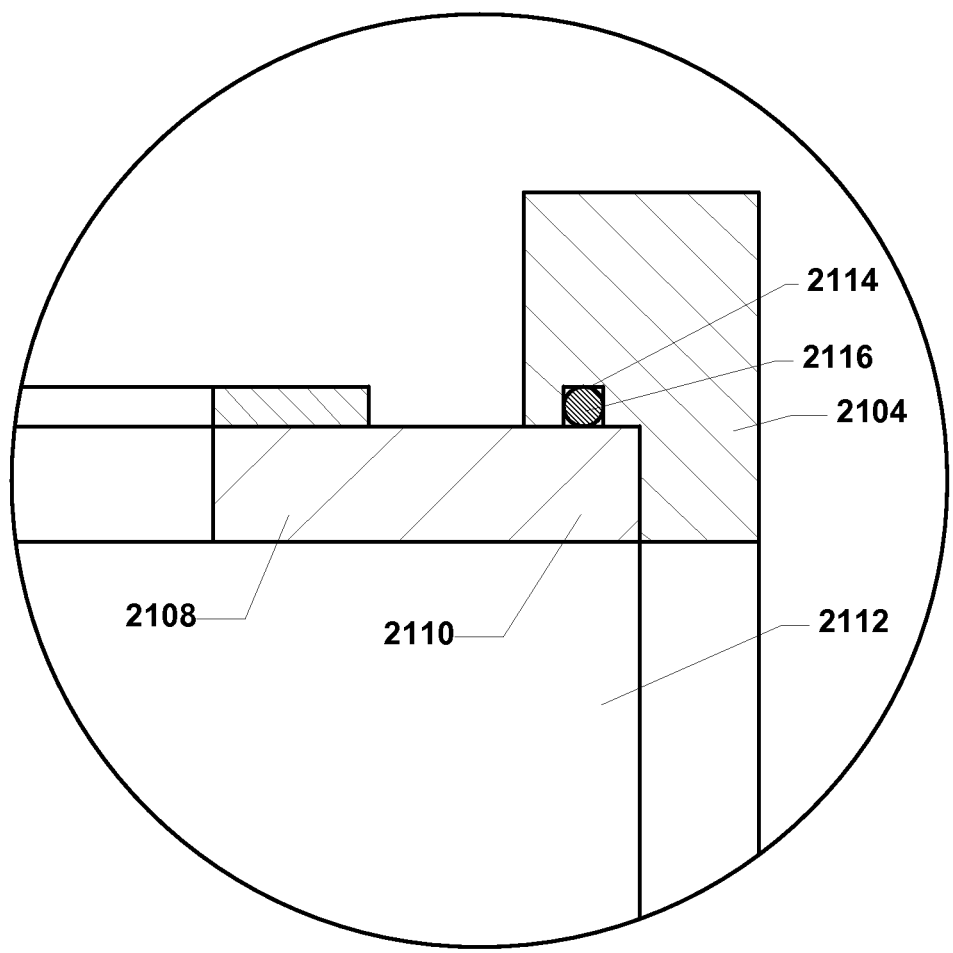
FIG. 22 is a detailed view of the seventh embodiment of the rigid seal taken at circle 22 in FIG. 21.

Referring to FIG. 21 and FIG. 22, a seventh embodiment of a seal is shown and is generally designated 2100. As shown, the seal 2100 can include a first seal member 2102 and a second seal member 2104. The first seal member 2102 can include an annular ring portion 2106 and a hub portion 2108 extending there from. The hub portion 2108 can be hollow and generally cylindrical. Further, the hub portion 2108 can include a distal end 2110.

In a particular embodiment, the second seal member 2104 can be a generally annular ring. Further, the second seal member 2104 can include a pocket 2112 formed therein. The pocket 2112 can be sized and shaped to receive the distal end 2110 of the hub portion 2108 of the first seal member 2102 in an interference fit. As further shown in FIG. 22, an O-ring groove 2114 can be formed in the second seal member 2104 around the pocket 2112. Also, an O-ring 2116 can be disposed within the O-ring groove 2114.

Accordingly, as shown in FIG. 22, the distal end 2110 of the hub portion 2108 of the first seal member 2102 can be fitted into the second seal member 2104, e.g., into the pocket 2112 formed in the second seal member 2104. Further, the O-ring 2116 can circumscribe the distal end 2110 of the hub portion 2108 of the first seal member 2102. The O-ring 2116 can also engage the distal end 2110 of the hub portion 2108 of the first seal member 2102 and form a seal interface with the distal end 2110 of the hub portion 2108 of the first seal member 2102.

As shown in FIG. 21, the seal 2100 can include a first radial bore 2120 and a second radial bore 2122 formed in the hub portion 2108 of the first seal member 2102. The first radial bore 2120 and the second radial bore 2122 are sized and shaped to engage an actuator rod of a butterfly valve in an interference fit.

FIG. 21 further indicates that a resilient member 2130 can circumscribe the hub portion 2108 of the first seal member 2102. The resilient member 2130 can include a first radial bore 2132 and a second radial bore 2134. The radial bores 2132, 2134 formed in the resilient member 2130 can be aligned with the radial bores 2120, 2122 formed in the hub portion 2108 of the first seal member 2102. The resilient member 2130 can assist in properly aligning the seal 2100 within a butterfly valve.

Figure 23:
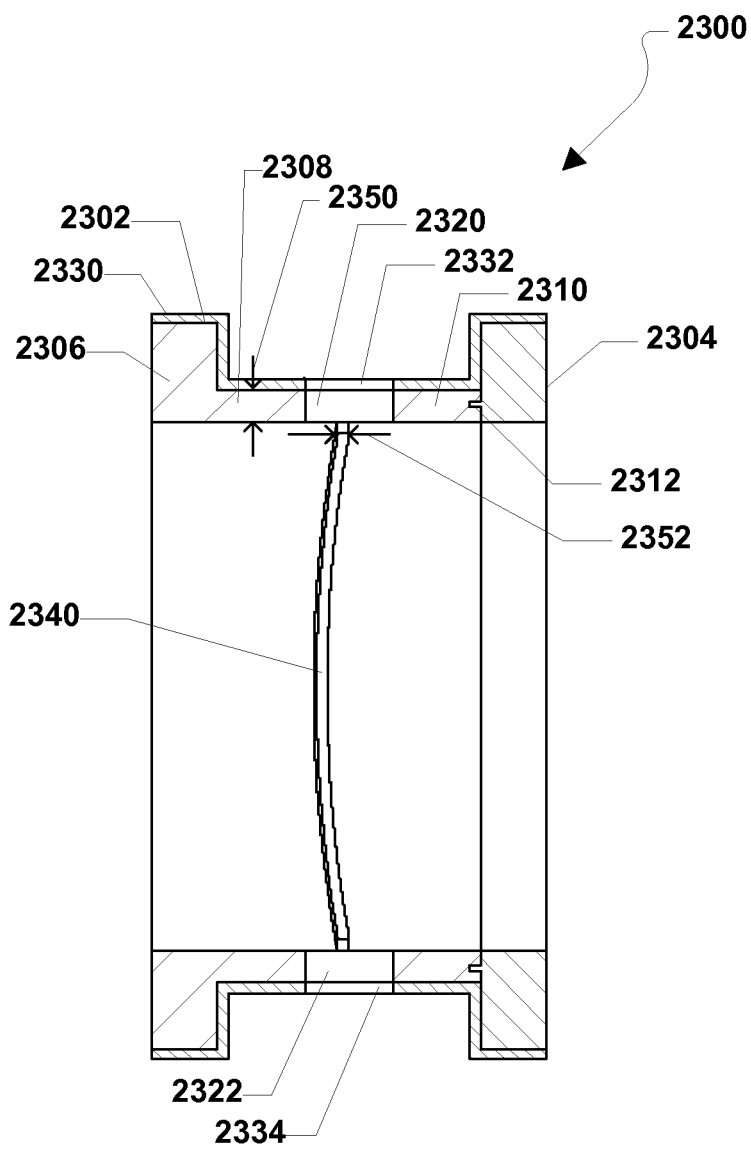
FIG. 23 is a first cross-section view of an eighth embodiment of a rigid seal.
Figure 24:
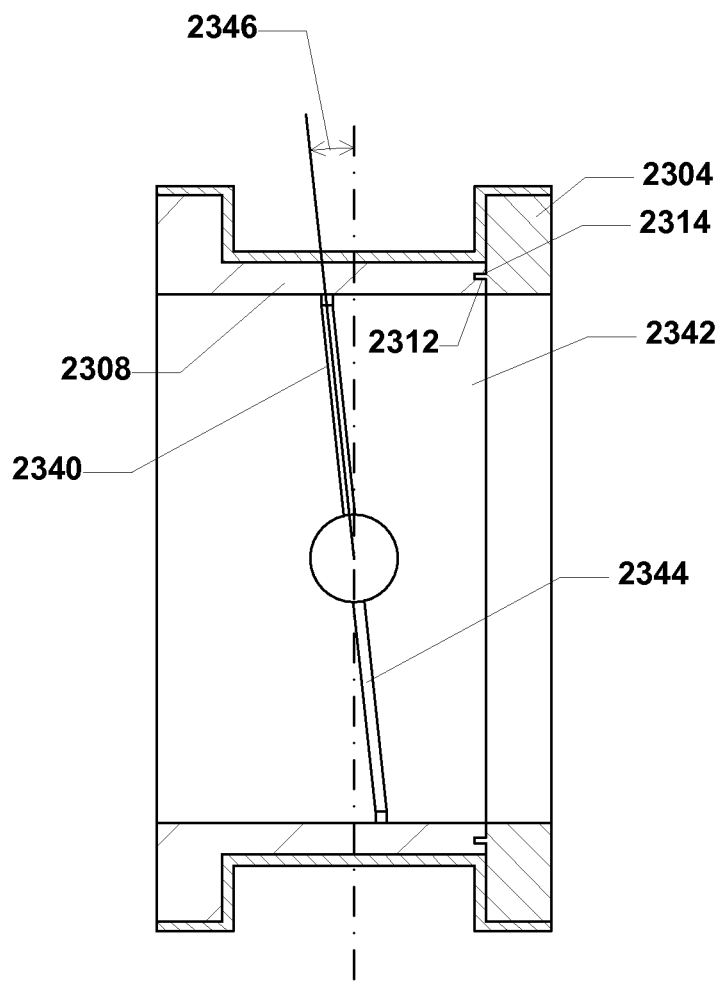
FIG. 24 is a second cross-section view the eighth embodiment of rigid seal.

Referring to FIG. 23 and FIG. 24, an eighth embodiment of a seal is shown and is generally designated 2300. As shown, the seal 2300 can include a first seal member 2302 and a second seal member 2304. The first seal member 2302 can include an annular ring portion 2306 and a hub portion 2308 extending there from. The hub portion 2308 can be hollow and generally cylindrical. Further, the hub portion 2308 can include a distal end 2310. The distal end 2310 of the hub portion 2308 can be formed with a first sealing element 2312. For example, the first sealing element 2312 can be a groove that extends into the face of the distal end 2310 of the hub portion 2308.

In a particular embodiment, the second seal member 2304 can be a generally annular ring. Further, the second seal member 2304 can include a second sealing element 2314 extending from a face of the second seal member 2304. The second sealing element 2314 is configured engage the first sealing element 2312 formed in the first seal member 2302. In a particular embodiment, the second sealing element 2314 can be a tongue that is sized and shaped to extend into a groove, e.g., the first sealing element 2312.

As shown in FIG. 23, the seal 2300 can include a first radial bore 2320 and a second radial bore 2322 formed in the hub portion 2308 of the first seal member 2302. The first radial bore 2320 and the second radial bore 2322 are sized and shaped to engage an actuator rod of a butterfly valve in an interference fit.

FIG. 23 further indicates that a resilient member 2330 can circumscribe the seal 2300. As shown, the resilient member 2330 can circumscribe the outer periphery of the first seal member 2302 and the outer periphery of the second seal member 2304. The resilient member 2330 can include a first radial bore 2332 and a second radial bore 2334. The radial bores 2332, 2334 formed in the resilient member 2330 can be aligned with the radial bores 2320, 2322 formed in the hub portion 2308 of the first seal member 2302. The resilient member 2330 can assist in properly aligning the seal 2300 within a butterfly valve.

FIG. 24 illustrates that the seal 2300 can include a first interior rib 2340 formed within the hub portion 2308 of the first seal member 2302, e.g., along an interior surface 2342 of the hub portion 2308. A second interior rib 2344 can also be formed within the hub portion 2308 of the first seal member 2302 along the interior surface 2342 of the hub portion 2308. In a particular embodiment, when the seal 2300 is installed within a valve, e.g., a butterfly valve as described herein, a disc within the butterfly valve can engage the interior ribs 2340, 2344 in order to create a seal interface and substantially prevent fluid communication through the butterfly valve. Specifically, a first face, e.g., a front face, of a first vane of the disc can engage the first interior rib 2340 of the seal 2300 and a second face, e.g., a back face, of a second vane of the disc can engage the second interior rib 2344 of the seal 2300.

Each rib 2340, 2344 can form an angle ($\alpha$) 2346 with respect to an axis 2348 through the mid-plane of the seal 2300. In a particular embodiment, α 2346 is approximately one degree (1°) or greater. In another embodiment, α 2346 is approximately two degrees (2°) or greater. In yet another embodiment, α 2346 is approximately three degrees (3°) or greater. In still another embodiment, α 2346 is approximately four degrees (4°) or greater. In another embodiment, α 2346 is approximately five degrees (5°) or greater. In yet another embodiment, α 2346 is no greater than ten degrees (10°).

As shown in FIG. 23, the hub portion 2308 of the first seal member 2302 can have a hub thickness ($T_H$) 2350. Further, each interior rib 2340, 2344 can have a rib thickness ($T_R$) 2352. In a particular embodiment, a rib-to-hub thickness ratio, $T_R/T_H$, is less than or equal 0.5. In another embodiment, $T_R/T_H$, is approximately 0.45. In yet another embodiment, $T_R/T_H$, is approximately 0.4. In still another embodiment, $T_R/T_H$, is approximately 0.35. In another embodiment, $T_R/T_H$, is approximately 0.3. In yet still another embodiment, $T_R/T_H$, is approximately 0.25. In another embodiment, $T_R/T_H$, is approximately 0.2.

Figure 25:
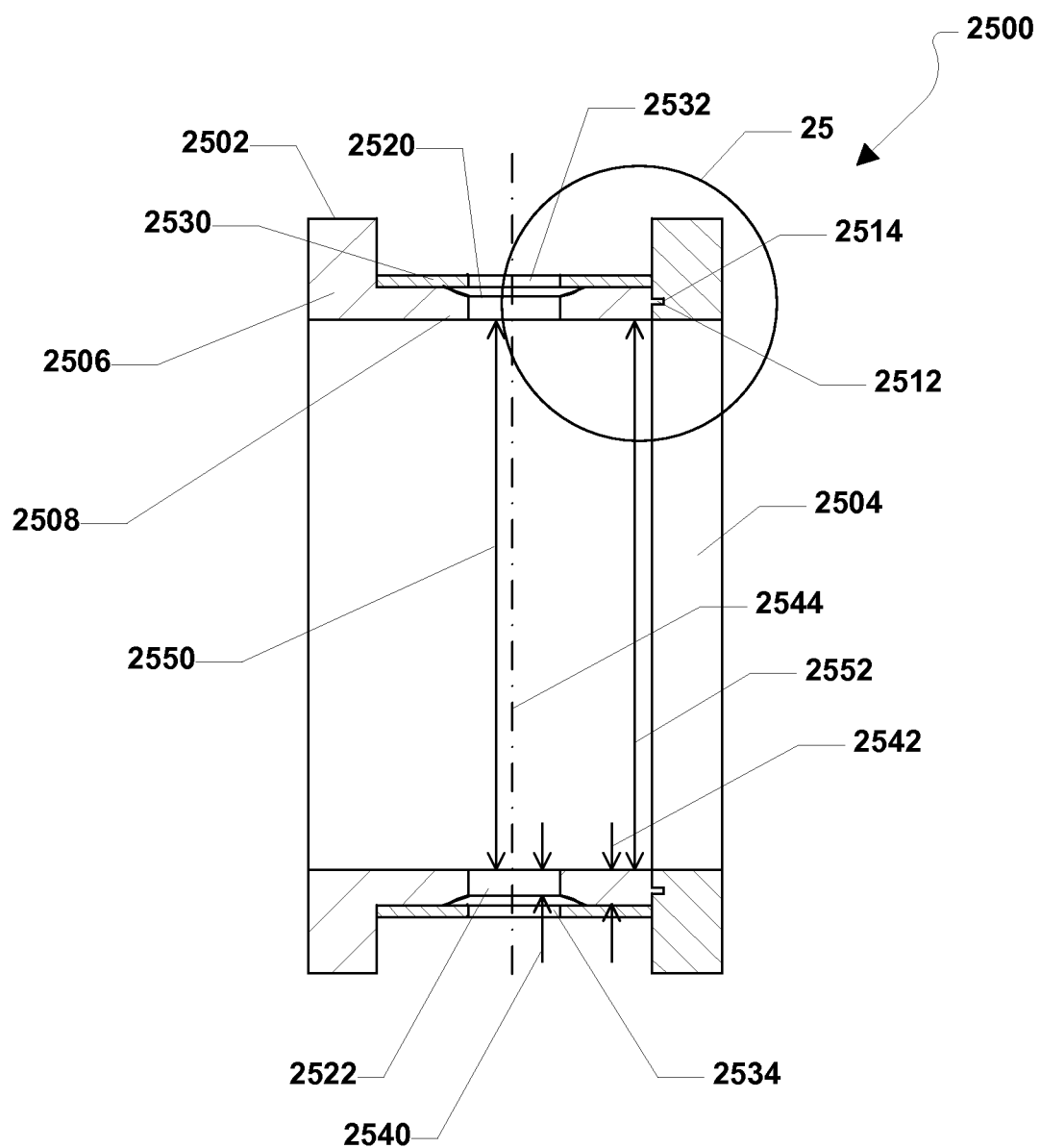
FIG. 25 is a cross-section view of a ninth embodiment of a rigid seal.
Figure 26:
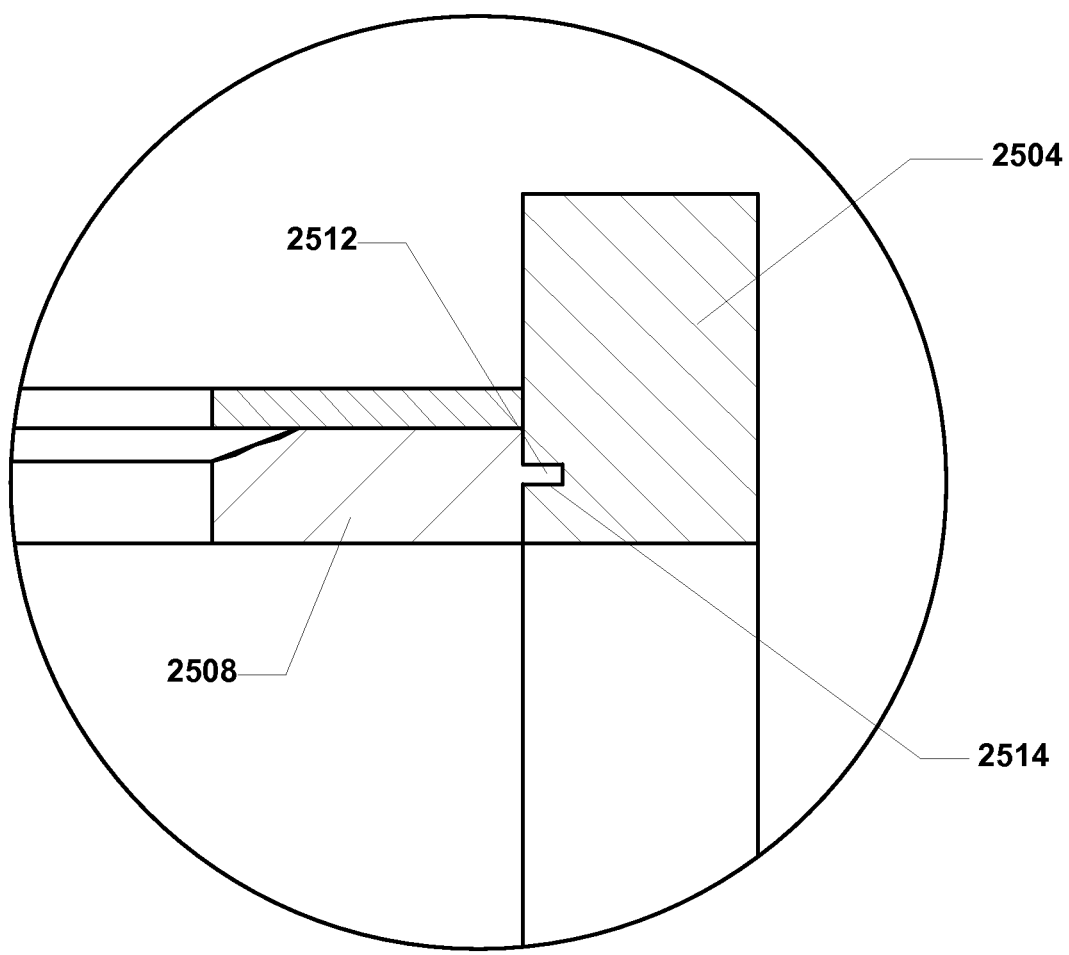
FIG. 26 is a detailed view of the ninth embodiment of the rigid seal taken at circle 26 in FIG. 25.

FIG. 25 and FIG. 26 illustrate a ninth embodiment of a seal, generally designated 2500. As shown, the seal 2500 can include a first seal member 2502 and a second seal member 2504. The first seal member 2502 can include an annular ring portion 2506 and a hub portion 2508 extending there from. The hub portion 2508 can be hollow and generally cylindrical. Further, the hub portion 2508 can include a distal end 2510. The distal end 2510 of the hub portion 2508 can be formed with a first sealing element 2512. For example, the first sealing element 2512 can be a tongue that extends from the face of the distal end 2510 of the hub portion 2508.

In a particular embodiment, the second seal member 2504 can be a generally annular ring. Further, the second seal member 2504 can include a second sealing element 2514 extending from a face of the second seal member 2504. The second sealing element 2514 is configured engage the first sealing element 2512 formed in the first seal member 2502. In a particular embodiment, the second sealing element 2514 can be a groove that is sized and shaped to receive a tongue, e.g., the first sealing element 2512.

As shown in FIG. 25, the seal 2500 can include a first radial bore 2520 and a second radial bore 2522 formed in the hub portion 2508 of the first seal member 2502. The first radial bore 2520 and the second radial bore 2522 are sized and shaped to engage an actuator rod of a butterfly valve in an interference fit.

FIG. 25 further indicates that a resilient member 2530 can circumscribe the seal 2500. As shown, the resilient member 2530 can circumscribe the outer periphery of the first seal member 2502 and the outer periphery of the second seal member 2504. The resilient member 2530 can include a first radial bore 2532 and a second radial bore 2534. The radial bores 2532, 2534 formed in the resilient member 2530 can be aligned with the radial bores 2520, 2522 formed in the hub portion 2508 of the first seal member 2502. The resilient member 2530 can assist in properly aligning the seal 2500 within a butterfly valve.

As shown in FIG. 25, the hub portion 2508 of the first seal member 2502 can have a disc engagement thickness ($T_{DE}$) 2540 and an edge hub thickness ($T_{HE}$) 2542. In a particular embodiment, $T_{DE}$ 2540 can be measured at or near an axis 2544 of the seal 2500 along which an actuator rod is installed. In other words, $T_{DE}$ can be measured at a location within the first seal member 2502 wherein a portion of the interior surface of the first seal member 2502 engages a disc installed within the seal 2500. That portion of the interior surface of the first seal member 2502 lies along the axis along which the actuator rod is installed and is substantially perpendicular to a longitudinal axis of the seal 2500.

$T_{HE}$ 2542 can be measured at or near the distal end 2510 of the first seal member 2502 or at or near the interface between the annular ring portion 2506 and the hub portion 2508 of the first seal member 2502. In a particular embodiment, a thickness ratio, $T_{DE}/T_{HE}$, is less than or equal to 0.8. In another embodiment, $T_{DE}/T_{HE}$ is less than or equal to 0.7. In still another embodiment, $T_{DE}/T_{HE}$ is less than or equal to 0.5. In another embodiment, $T_{DE}/T_{HE}$ is approximately 0.45. In yet another embodiment, $T_{DE}/T_{HE}$ is approximately 0.4. In still another embodiment, $T_{DE}/T_{HE}$ is approximately 0.35. In another embodiment, $T_{DE}/T_{HE}$ is approximately 0.3. In yet still another embodiment, $T_{DE}/T_{HE}$ is approximately 0.25. In another embodiment, $T_{DE}/T_{HE}$ is approximately 0.2. In still another embodiment, $T_{DE}/T_{HE}$ is not less than 0.10.

FIG. 25 further indicates that the first seal member 2502 can have a central hub diameter ($D_{HC}$) 2550 and an edge hub diameter ($D_{HE}$) 2552. In a particular embodiment, $D_{HC}$ 2550 can be measured at or near the central axis 2544 of the seal 2500. $D_{HE}$ 2552 can be measured at or near the distal end 2510 of the first seal member 2502 or at or near the interface between the annular ring portion 2506 and the hub portion 2508 of the first seal member 2502. In a particular embodiment, a diameter ratio, $D_{HC}/D_{HE}$, is less than or equal to 1.0. In another embodiment, $D_{HC}/D_{HE}$, is approximately 0.99. In yet another embodiment, $D_{HC}/D_{HE}$, is approximately 0.98. In still another embodiment, $D_{HC}/D_{HE}$, is approximately 0.97. In another embodiment, $D_{HC}/D_{HE}$, is approximately 0.96. In still another embodiment, $D_{HC}/D_{HE}$ is not less than 0.95.

Figure 27:
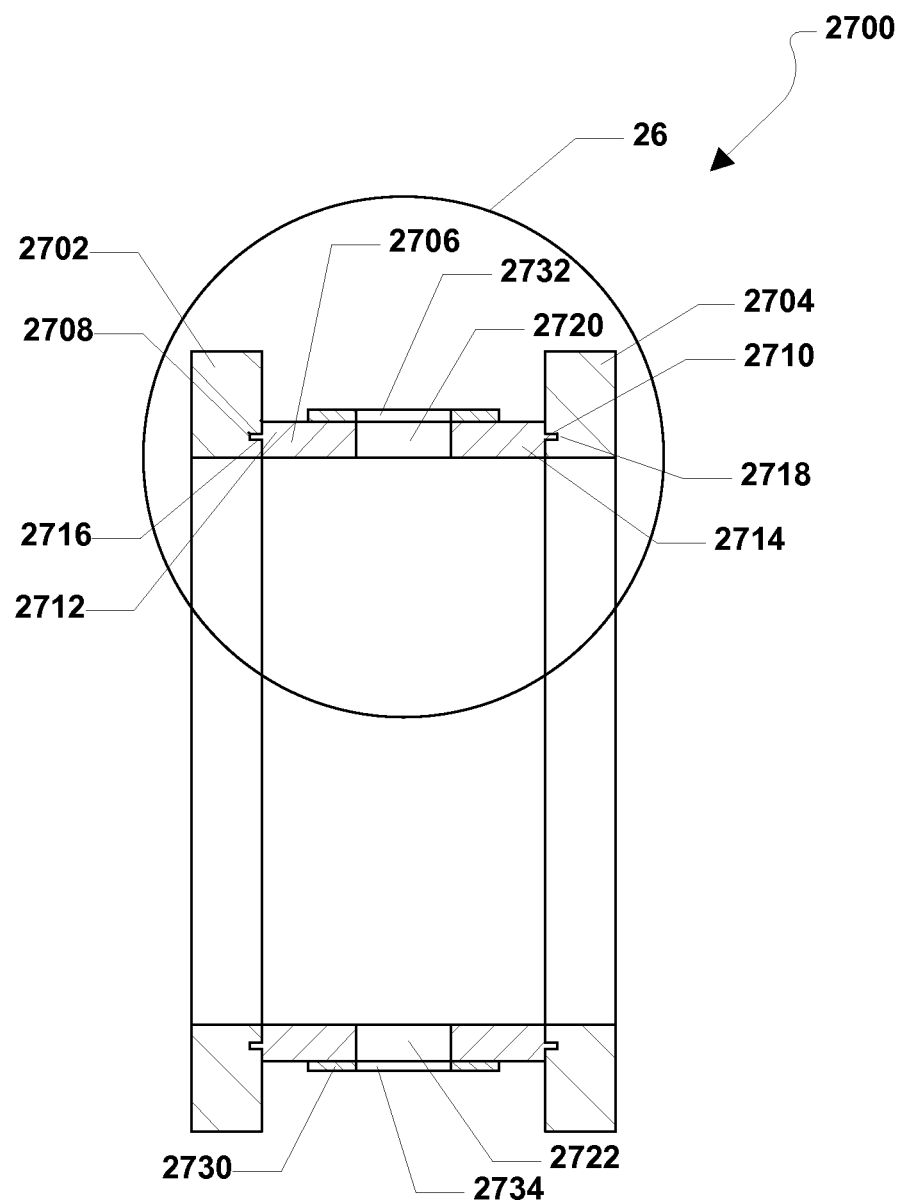
FIG. 27 is a cross-section view of a tenth embodiment of a rigid seal.
Figure 28:
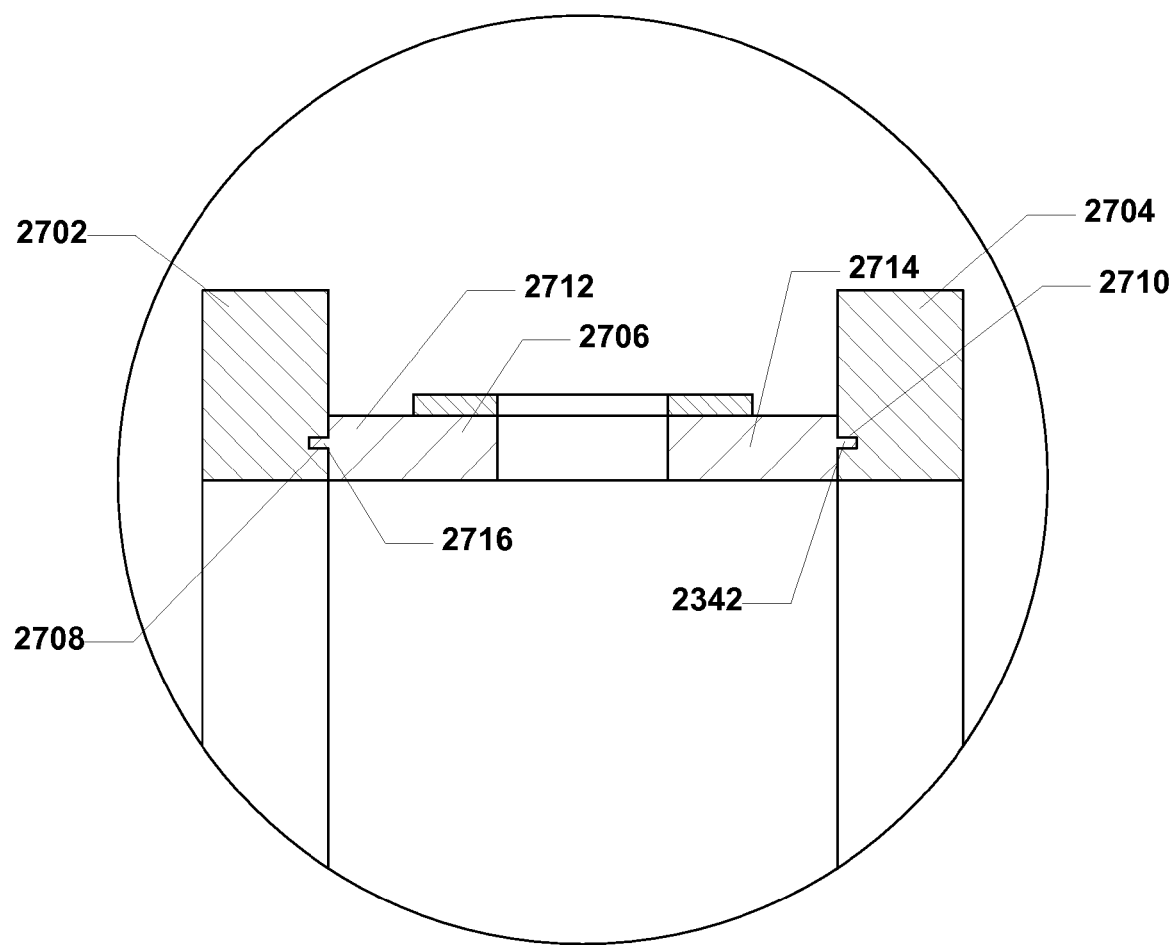
FIG. 28 is a detailed view of the tenth embodiment of the rigid seal taken at circle 28 in FIG. 27.

Referring to FIG. 27 and FIG. 28, a tenth embodiment of a seal is shown and is generally designated 2700. As shown, the seal 2700 can include a first seal member 2702 and a second seal member 2704. Further, a third seal member 2706 can be disposed between the first seal member 2702 and the second seal member 2704. The first seal member 2702 can be annular ring. Also, the second seal member can be an annular ring. The third seal member 2706 can be a hollow, generally cylindrical hub.

In a particular embodiment, the first seal member 2702 can include a first sealing element 2708 formed in the face of the first seal member 2702. The first sealing element 2708 can include a groove formed in the face of the first seal member 2702. The second seal member 2704 can include a second sealing element 2710 formed in the face of the second seal member 2704. The second sealing element 2710 can include a groove formed in the face of the second seal member 2704.

The third seal member 2706 can include a first end 2712 and a second end 2714. The first end 2712 of the third seal member 2706 can be formed with a third sealing element 2716. In a particular embodiment, the third sealing element 2716 can be a tongue that extends substantially perpendicular from the face of the first end 2712 of the third seal member 2706. Also, the third sealing element 2716 can be sized and shaped to fit into a groove, e.g., the first sealing element 2708. The second end 2714 of the third seal member 2706 can be formed with a fourth sealing element 2718. In a particular embodiment, the fourth sealing element 2718 can be a tongue that extends substantially perpendicular from the face of the second end 2714 of the third seal member 2706. Also, the third sealing element 2718 can be sized and shaped to fit into a groove, e.g., the second sealing element 2710.

As shown in FIG. 27, the seal 2700 can include a first radial bore 2720 and a second radial bore 2722 formed in the third seal member 2706. The first radial bore 2720 and the second radial bore 2722 are sized and shaped to engage an actuator rod of a butterfly valve in an interference fit.

FIG. 27 further indicates that a resilient member 2730 can circumscribe the seal 2700. As shown, the resilient member 2730 can circumscribe the outer periphery of the third seal member 2706. The resilient member 2730 can include a first radial bore 2732 and a second radial bore 2734. The radial bores 2732, 2734 formed in the resilient member 2730 can be aligned with the radial bores 2720, 2722 formed in the third seal member 2706. The resilient member 2730 can assist in properly aligning the seal 2700 within a butterfly valve.

Figure 29:
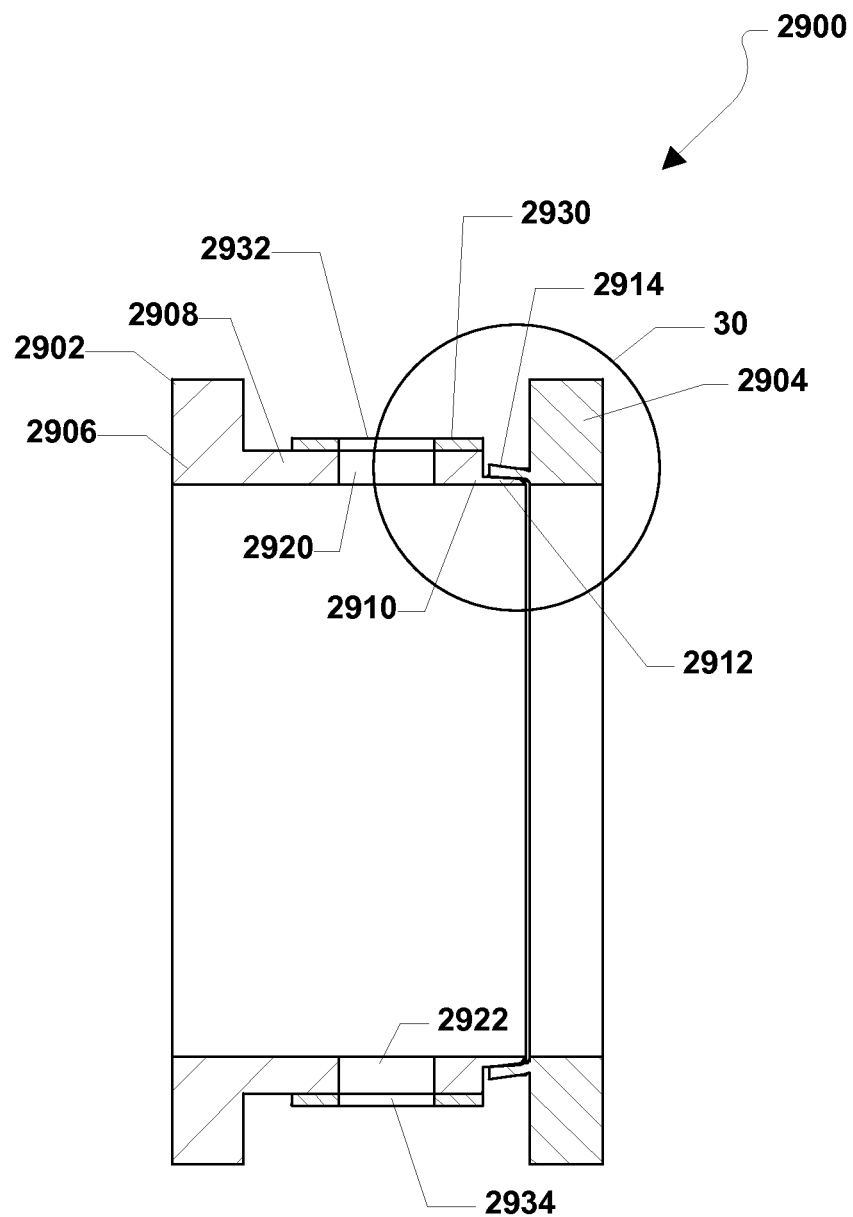
FIG. 29 is a cross-section view of an eleventh embodiment of a rigid seal.
Figure 30:
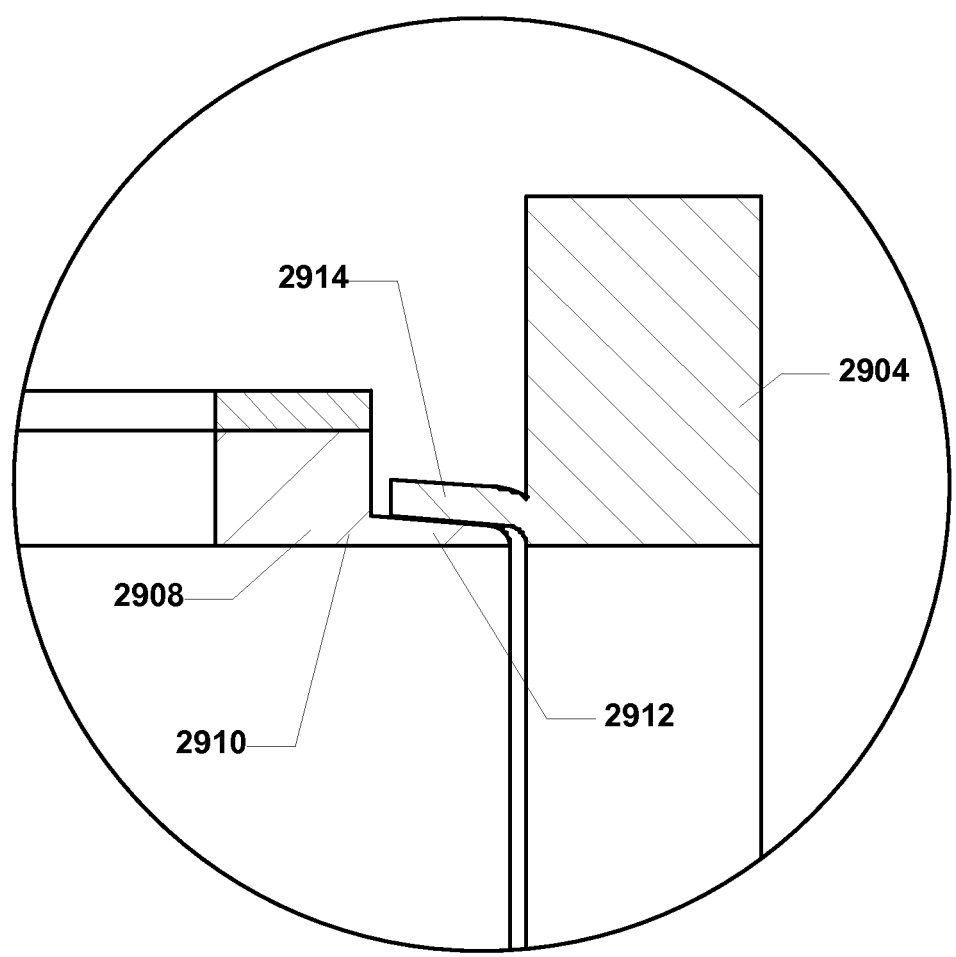
FIG. 30 is a detailed view of the eleventh embodiment of the rigid seal taken at circle 30 in FIG. 29.

Referring to FIG. 29 and FIG. 30, an eleventh embodiment of a seal is shown and is generally designated 2900. As shown, the seal 2900 can include a first seal member 2902 and a second seal member 2904. The first seal member 2902 can include an annular ring portion 2906 and a hub portion 2908 extending there from. The hub portion 2908 can be hollow and generally cylindrical. Further, the hub portion 2908 can include a distal end 2910. The distal end 2910 of the hub portion 2908 can be formed with a first sealing element 2912. For example, the first sealing element 2912 can be a flared sleeve that is formed on the distal end 2910 of the hub portion 2908.

In a particular embodiment, the second seal member 2904 can be a generally annular ring. Further, the second seal member 2904 can include a second sealing element 2914. The second sealing element 2914 is configured engage the first sealing element 2912 formed in the first seal member 2902. The second sealing element 2914 can be a flared tube that is sized and shaped to fit around, and engage, the first sealing element 2912.

As illustrated in FIG. 30, the first sealing element 2912 can be fitted into the second sealing element 2914. Further, the second sealing element 2914 can be flared, or deformed, radially outward by the first sealing element 2912 as the second sealing element 2914 is installed around the first sealing element 2912.

As shown in FIG. 29, the seal 2900 can include a first radial bore 2920 and a second radial bore 2922 formed in the hub portion 2908 of the first seal member 2902. The first radial bore 2920 and the second radial bore 2922 are sized and shaped to engage an actuator rod of a butterfly valve in an interference fit.

FIG. 29 further indicates that a resilient member 2930 can circumscribe the hub portion 2908 of the first seal member 2902. The resilient member 2930 can include a first radial bore 2932 and a second radial bore 2934. The radial bores 2932, 2934 formed in the resilient member 2930 can be aligned with the radial bores 2920, 2922 formed in the hub portion 2908 of the first seal member 2902. The resilient member 2930 can assist in properly aligning the seal 2900 within a butterfly valve.

Figure 31:
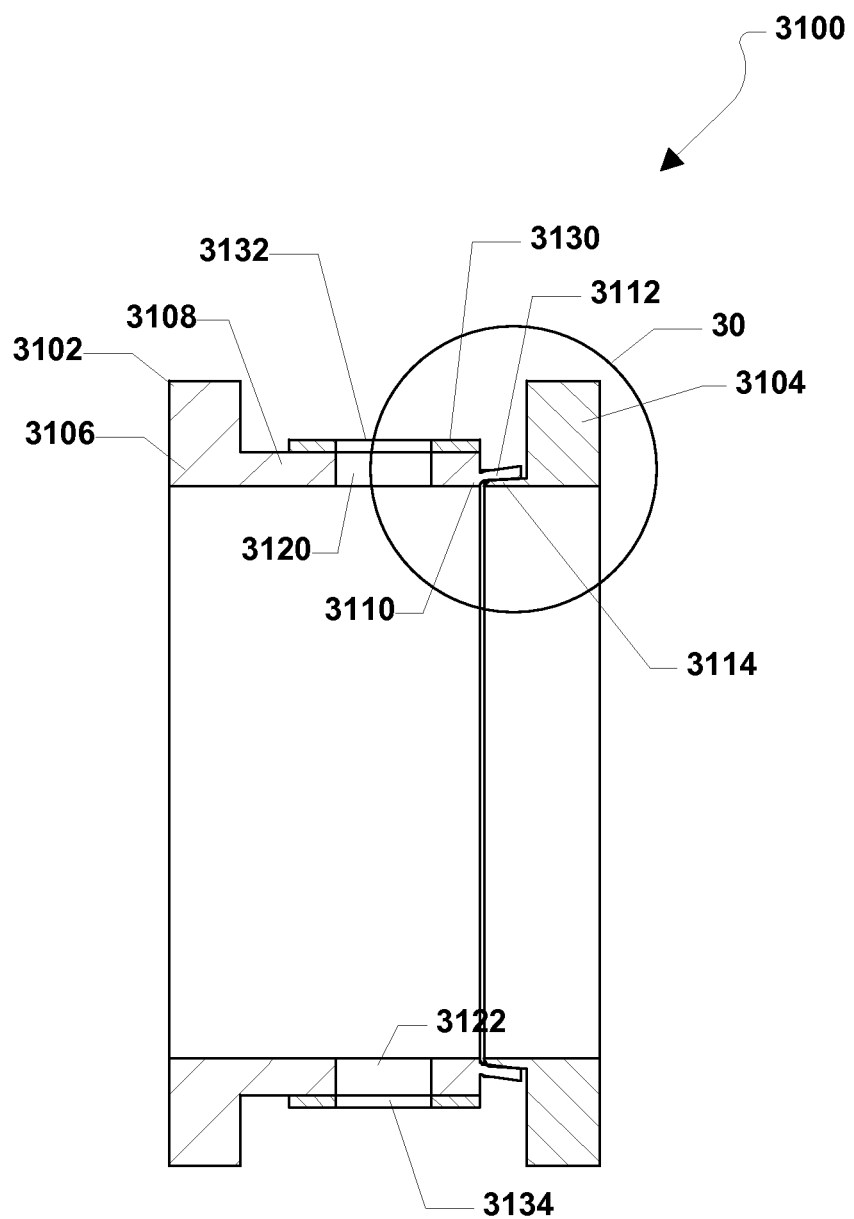
FIG. 31 is a cross-section view of a twelfth embodiment of a rigid seal.
Figure 32:
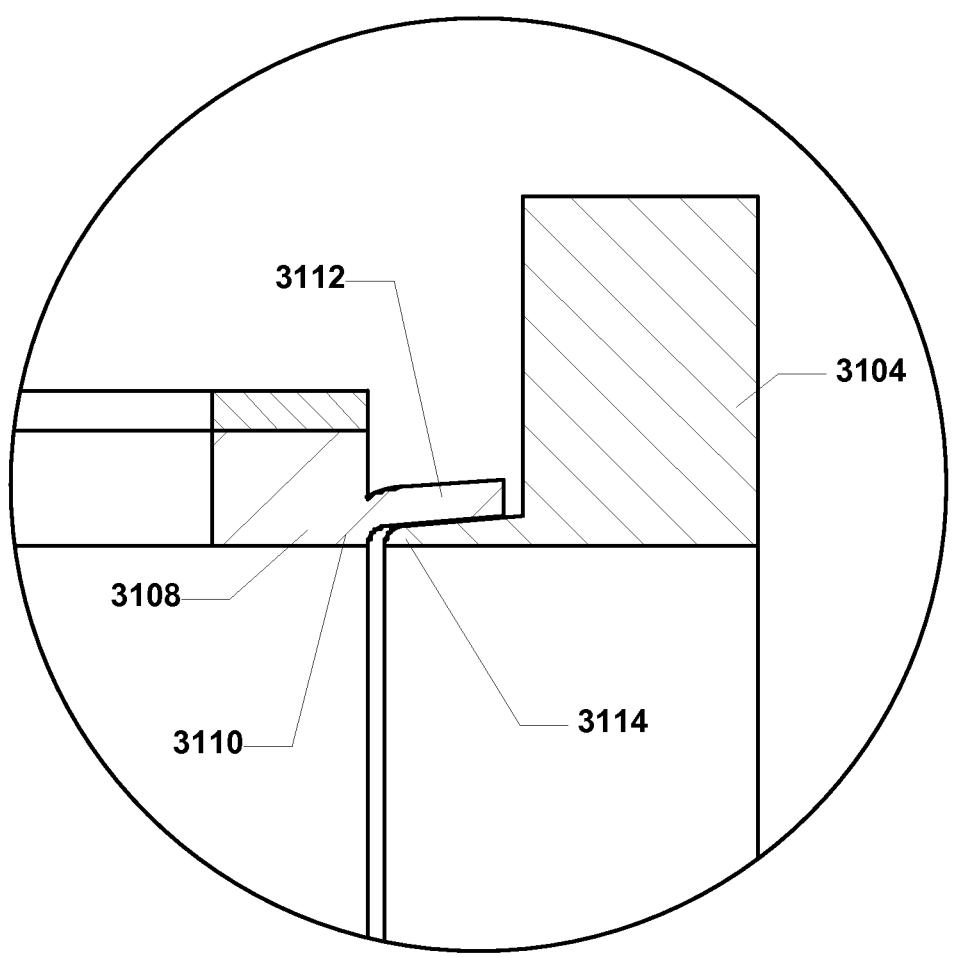
FIG. 32 is a detailed view of the twelfth embodiment of the rigid seal taken at circle 32 in FIG. 31.

Referring to FIG. 31 and FIG. 32, a twelfth embodiment of a seal is shown and is generally designated 3100. As shown, the seal 3100 can include a first seal member 3102 and a second seal member 3104. The first seal member 3102 can include an annular ring portion 3106 and a hub portion 3108 extending there from. The hub portion 3108 can be hollow and generally cylindrical. Further, the hub portion 3108 can include a distal end 3110. The distal end 3110 of the hub portion 3108 can be formed with a first sealing element 3112. For example, the first sealing element 3112 can be a flared tube that extends from the distal end 3110 of the hub portion 3108.

In a particular embodiment, the second seal member 3104 can be a generally annular ring. Further, the second seal member 3104 can include a second sealing element 3114. The second sealing element 3114 is configured engage the first sealing element 3112 formed in the first seal member 3112. The second sealing element 3114 can be a flared sleeve that is sized and shaped to fit into, and engage, the first sealing element 3112.

As illustrated in FIG. 32, the first sealing element 3112 can be fitted around the second sealing element 3114. Further, the first sealing element 3112 can be flared, or deformed, radially outward by the second sealing element 3114 as the first sealing element 3112 is installed around the second sealing element 3114.

As shown in FIG. 31, the seal 3100 can include a first radial bore 3120 and a second radial bore 3122 formed in the hub portion 3108 of the first seal member 3102. The first radial bore 3120 and the second radial bore 3122 are sized and shaped to engage an actuator rod of a butterfly valve in an interference fit.

FIG. 31 further indicates that a resilient member 3130 can circumscribe the hub portion 3108 of the first seal member 3102. The resilient member 3130 can include a first radial bore 3132 and a second radial bore 3134. The radial bores 3132, 3134 formed in the resilient member 3130 can be aligned with the radial bores 3120, 3122 formed in the hub portion 3108 of the first seal member 3102. The resilient member 3130 can assist in properly aligning the seal 3100 within a butterfly valve.

Figure 33:
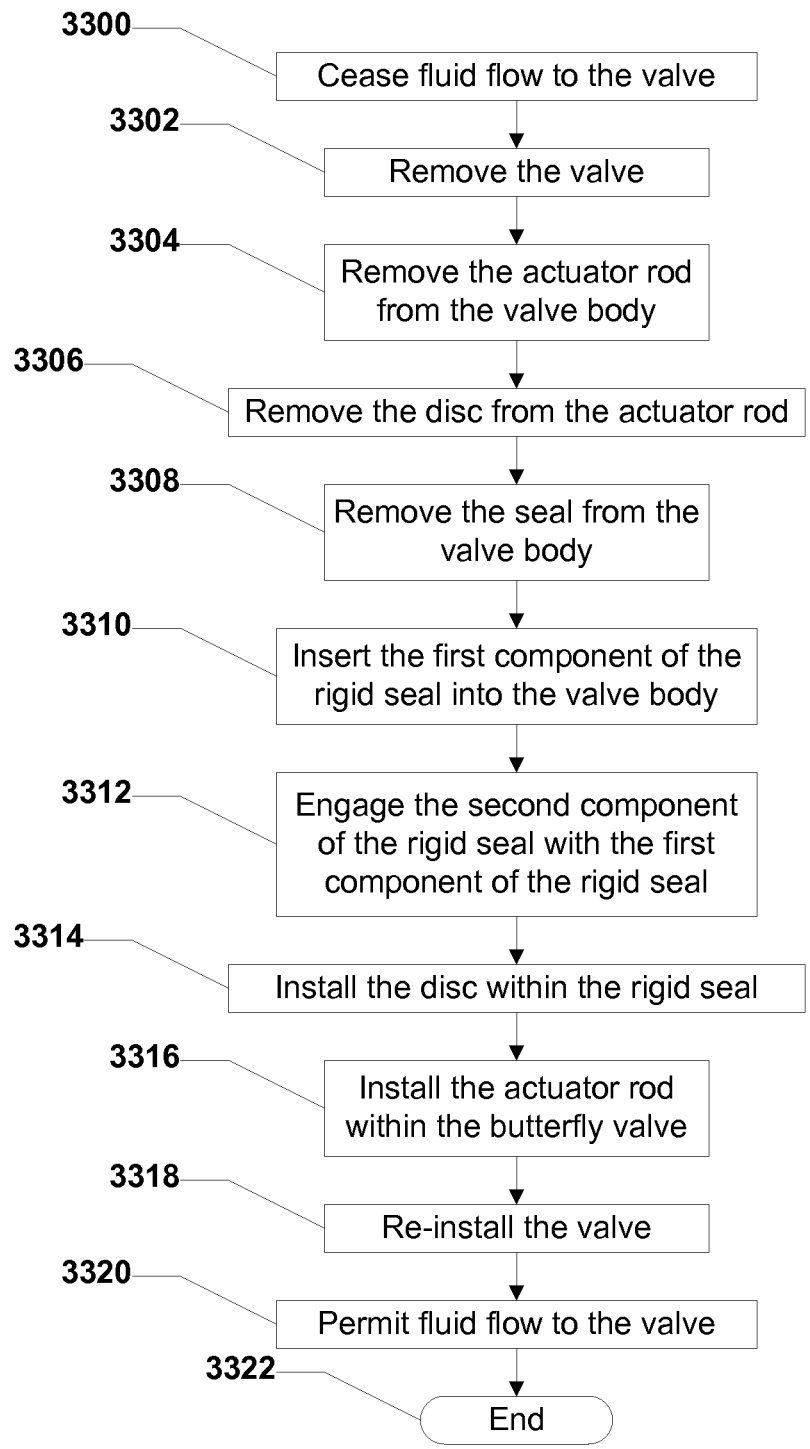
FIG. 33 is a flow chart illustrating a method of repairing, or modifying, a valve.

Referring now to FIG. 33, a method of repairing, or modifying, a valve is shown and commences at block 3300. In a particular embodiment, the valve being repaired can be a butterfly valve having a valve body, a disc, an actuator rod, and a seal. At block 3300, fluid flow to the valve can be ceased. At block 3302, the valve can be removed from the mechanical fluid joint in which it is installed. For example, the valve can be removed by disassembling a first pipe and a second pipe from the valve by loosening and removing a series of bolts.

Moving to block 3304, the actuator rod can be removed from the butterfly valve. The actuator rod can be removed by loosening one or more threaded fasteners, e.g., bolts, connecting the disc to the actuator rod. After the actuator rod is removed from the valve, the disc can be removed from the butterfly valve, at block 3306.

Continuing to block 3308, the seal can be removed from the valve body. At block 3310, a first member of a rigid seal can be installed within the valve body, from a first end of the valve body, e.g., an upstream end of the valve body. Further, at block 3312, a second member of the rigid seal can be engaged with the first member on the opposite end of the valve body, e.g., the downstream end of the valve body. Proceeding to block 3314, the disc can be installed within the rigid seal. In a particular embodiment, the disc can be installed perpendicularly within the rigid seal. At block 3316, the actuator rod can be installed within the butterfly valve so that the actuator rod is engaged with the disc. Moreover, at block 3318, the valve can be re-installed within the mechanical fluid joint. Thereafter, fluid flow can, once again, be permitted to the valve 3320. The method can then end at state 3322.

One of more embodiments, described herein, can be installed within a valve body without having to cut and machine the valve body. As such, the cost associated with manufacturing a valve with a rigid seal is substantially reduced. Further, one or more embodiments can be used in corrosive environments in which resilient seals cannot be used. Embodiments described herein also provide one or more ribs within the seal that can engage a disc within a valve to provide greater sealing pressure. The ribs can be sized and shaped so that the ribs can slightly deform when engaged with the disc to increase the sealing pressure of the valve. Further, embodiments herein provide a sealing interface that is distanced from a central axis of the valve along which an actuator rod is installed. Spacing the sealing interface from the central axis decreases leakage of the valve in which the seal is installed.

Additionally, embodiments described herein can include a central hub having a decreased thickness area. The decreased thickness area can deform when engaged with a disc and increase the sealing capacity of the valve. Further, the central hub can have a central hub diameter that is smaller than an edge hub diameter. The smaller central hub diameter can provide an interference fit with a disc installed within the valve when the valve is closed.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A valve (100), comprising:
   a valve body (102) defining a first central bore (104) for passage of fluid there through, the central bore (104) having a longitudinal axis, the valve body (102) also defining a second central bore (132) perpendicular to the first central bore (104) along a central axis (124), wherein the second central bore (132) is configured to receive an actuator rod (134);
   a rigid seal (150) installed within the valve body (102) along the first central bore (104), wherein the seal (150) comprises:
      a first seal member (152) comprising an annular ring portion (156) and a hub portion (158) extending from the annular ring portion (156), wherein the hub portion (158) includes a first radial bore (170) and a second radial bore (172) aligned with the second central bore (132) along the central axis (124); and
      a second seal member (154) including an annular ring configured to engage a distal end (160) of the hub portion (158) and create a sealing engagement between the hub portion (158) of the first seal member and the annular ring of the second seal member by a complementary engagement structure wherein one seal member extends into the other seal member when a compressive force is applied to the first (152) and the second seal members (154), wherein the sealing engagement occurs at a seal interface (180) and the entire seal interface (180) is spaced a distance, D, from the central axis (124).

2. The valve (100) of claim 1, wherein the annular ring portion (156) of the first seal member (152) includes an outer diameter, $OD_R$, wherein the hub portion (158) of the first seal member (152) includes an outer diameter, $OD_H$, and wherein $OD_R$ is greater than $OD_H$.

3. The valve (100) of claim 1, further comprising a disc (140) installed perpendicularly within the seal, wherein the disc (140) is movable between a first position in which fluid communication through the seal (150) is blocked and a second position in which fluid communication through the seal (150) is permitted.

4. The valve (100) of claim 3, further comprising an actuator rod (134) extending through the valve body (102) and into the seal (150) wherein the actuator rod (134) is coupled to the disc (140) and wherein the actuator rod (134) is rotatable to rotate the disc (140) within the seal (150).

5. The valve (100) of claim 1, wherein the complementary engagement structure includes a tongue and groove structure.

6. The valve (100) of claim 5, wherein the complementary engagement structure is rectangular, wedge-shaped, K-shaped, or a combination thereof.

7. The valve (100) of claim 1, wherein the complementary engagement structure includes a groove and a generally curved flange.

8. The valve (100) of claim 7, wherein the groove is configured to deform the flange.

9. The valve (100) of claim 1, wherein the complementary engagement structure includes a flared tube and a flared sleeve, wherein the flared tube fits around the flared sleeve.

10. The valve (100) of claim 1, wherein the second seal member (154) includes a pocket formed therein and wherein the hub portion (158) of the first seal member (152) is configured to fit into the pocket.

11. A seal assembly, the seal assembly comprising:
    a first rigid seal member (152) having an annular ring portion (156) and a hub portion (158), wherein the hub portion (158) includes a first radial bore (170) and a second radial bore (172) formed along a central axis (124); and
    a second rigid seal member (154) include an annular ring, wherein the first seal member (152) and the second seal member (154) include a complementary engagement structure wherein one seal member extends into the other seal member configured to create a seal interface (180) within a valve (100) in which the seal assembly is installed, wherein the entire seal interface (180) is spaced a distance, D, from the central axis (124); and,
    wherein the seal assembly is adapted to be disposed in a valve body (102) defining a first central bore (104) for passage of fluid there through, the central bore (104) having a longitudinal axis~the valve body (102) also defining a second central bore (132) perpendicular to the first central bore (104) along the central axis (124), wherein the second central bore (132) is configured to receive an actuator rod (134).

12. The seal assembly of claim 11, wherein the complementary engagement structure is configured to provide the sealing interface (180) when the seal assembly is compressed along a longitudinal axis.

13. The seal assembly of claim 11, wherein the seal (150) comprises a generally rigid, corrosion resistant material.

14. The seal assembly of claim 13, wherein the generally rigid, corrosion resistant material comprises a fluoropolymer.

15. The seal assembly of claim 11, further comprising a first interior rib (2340) extending from an interior surface of the hub portion (2308) and a second interior rib (2344) extending from the interior surface of the hub portion (2308) opposite the first interior rib (2340).

16. The seal assembly of claim 15, wherein the first interior rib (2340) and the second interior rib (2344) form an angle, α, with respect to an axis through a mid-plane of the seal assembly.

17. The seal assembly of claim 11, wherein the hub (158) of the first seal member (152) defines a width, W, wherein the central axis (124) of the butterfly valve (100) lies approximately along the midpoint ±2% of W, and wherein D=0.5×W.

18. The seal assembly of claim 11, wherein the hub portion (158) of the seal (150) includes a disc engagement thickness, $T_{DE}$, and an edge hub thickness, $T_{HE}$, and wherein $T_{DE}/T_{HE}$ is less than or equal to 0.8.

19. The seal assembly of claim 11, wherein the hub portion (158) of the seal (150) includes a central hub diameter, $D_{HC}$, and an edge hub diameter, $D_{HE}$, and wherein $D_{HC}/D_{HE}$ is less than or equal to 1.0.

* * * * *